(12) United States Patent
Su

(10) Patent No.: US 10,792,578 B2
(45) Date of Patent: Oct. 6, 2020

(54) INTERACTIVE PLUSH CHARACTER SYSTEM

(71) Applicant: Thinker-Tinker, Inc., Pasadena, CA (US)

(72) Inventor: Yuting Su, Glendale, CA (US)

(73) Assignee: Thinker-Tinker, Inc., Pasadena, CA (US)

( * ) Notice: Subject to any disclaimer, the term of this patent is extended or adjusted under 35 U.S.C. 154(b) by 0 days.

(21) Appl. No.: 16/166,036

(22) Filed: Oct. 19, 2018

(65) Prior Publication Data

US 2019/0118104 A1 Apr. 25, 2019

Related U.S. Application Data

(60) Provisional application No. 62/575,174, filed on Oct. 20, 2017.

(51) Int. Cl.
| | |
|---|---|
| *A63H 3/00* | (2006.01) |
| *A63H 3/02* | (2006.01) |
| *A63H 3/04* | (2006.01) |
| *A63H 3/36* | (2006.01) |
| *G06F 3/0481* | (2013.01) |
| *G06F 9/451* | (2018.01) |

(52) U.S. Cl.
CPC ............. *A63H 3/005* (2013.01); *A63H 3/006* (2013.01); *A63H 3/02* (2013.01); *A63H 3/04* (2013.01); *A63H 3/36* (2013.01); *G06F 3/0481* (2013.01); *G06F 9/451* (2018.02)

(58) Field of Classification Search
CPC .......... A63H 3/005; A63H 3/006; A63H 3/02; A63H 3/04; A63H 3/36; G06F 9/451; G06F 3/36

USPC ........................... 446/73, 321, 369, 370, 372
See application file for complete search history.

(56) References Cited

U.S. PATENT DOCUMENTS

| | | | |
|---|---|---|---|
| 6,558,225 B1 * | 5/2003 | Rehkemper | A63H 3/003 40/448 |
| 7,066,781 B2 * | 6/2006 | Weston | A63H 3/00 446/268 |
| 7,488,231 B2 * | 2/2009 | Weston | A63H 3/00 446/175 |
| 8,267,737 B2 * | 9/2012 | Hardin | A63H 33/42 446/175 |

(Continued)

FOREIGN PATENT DOCUMENTS

ES 1 078 072 U 11/2012

*Primary Examiner* — Joseph B Baldori
(74) *Attorney, Agent, or Firm* — Knobbe, Martens, Olson & Bear, LLP

(57) ABSTRACT

A smart toy platform including a plush character configured to receive a computing device having a display screen, such as a tablet computer or smartphone. The plush includes a pocket configured to receive the computing device. The plush can also include one or more display openings associated with the pocket such that, when the computing device is properly positioned within the pocket, at least a portion of the display screen of the computing device is visible from an exterior of the plush through the display opening(s). The plush can include one or more limbs or other appendages (e.g., arm or leg). One or more of the appendages can include one or more sensors that can communicate with the computing device to allow interaction between the user and the plush/computing device.

14 Claims, 14 Drawing Sheets

(56) References Cited

U.S. PATENT DOCUMENTS

| | | | |
|---|---|---|---|
| 8,292,689 B2* | 10/2012 | Hardin | A63H 33/26 446/477 |
| 8,366,510 B2* | 2/2013 | Yamamoto | A63F 9/0291 446/456 |
| 8,613,639 B2* | 12/2013 | Hengel | A63H 3/02 446/73 |
| 8,753,165 B2* | 6/2014 | Weston | A63H 3/00 446/175 |
| 9,126,122 B2* | 9/2015 | Boeckle | A63H 3/28 |
| 9,480,929 B2* | 11/2016 | Weston | A63H 3/00 |
| 9,814,993 B2* | 11/2017 | Ponomarev | A63H 3/28 |
| 10,086,302 B2* | 10/2018 | Boeckle | A63H 3/28 |
| 2004/0214642 A1* | 10/2004 | Beck | A63F 13/327 463/40 |
| 2004/0229696 A1* | 11/2004 | Beck | A63F 13/02 463/40 |
| 2005/0227577 A1* | 10/2005 | McRae | A63H 3/02 446/268 |
| 2009/0117819 A1* | 5/2009 | Nakamura | A63H 3/28 446/297 |
| 2009/0197504 A1* | 8/2009 | Hsu | A63H 3/28 446/301 |
| 2011/0001892 A1* | 1/2011 | Gay | A63H 3/28 348/836 |
| 2011/0124264 A1 | 5/2011 | Garbos | |
| 2012/0309256 A1* | 12/2012 | Theodore | F16M 11/041 446/72 |
| 2013/0040530 A1* | 2/2013 | Matsuno | A63H 3/28 446/73 |
| 2013/0095725 A1* | 4/2013 | Von Mohr | A63H 3/48 446/321 |
| 2013/0178128 A1 | 7/2013 | Moritz | |
| 2013/0344770 A1 | 12/2013 | Gloge et al. | |
| 2014/0256213 A1* | 9/2014 | Copeland | A63H 3/006 446/268 |
| 2014/0273716 A1* | 9/2014 | Annis | A63H 33/22 446/175 |
| 2015/0120043 A1 | 4/2015 | Howard et al. | |
| 2015/0133022 A1* | 5/2015 | Ushiba | A63H 3/003 446/73 |
| 2015/0133025 A1 | 5/2015 | Ponomarev et al. | |
| 2015/0155901 A1* | 6/2015 | Zheng | H04M 1/72544 446/484 |
| 2015/0174499 A1* | 6/2015 | Rosenheck | A63H 3/005 434/118 |
| 2015/0202530 A1* | 7/2015 | Zheng | A63H 3/003 463/31 |
| 2016/0158659 A1 | 6/2016 | Pradhan et al. | |
| 2018/0290064 A1* | 10/2018 | Ikemoto | A63G 31/00 |
| 2019/0118104 A1* | 4/2019 | Su | A63H 3/005 |
| 2019/0371034 A1* | 12/2019 | Feghali | G06T 13/40 |

\* cited by examiner

INTERACTIVE PLUSH CHARACTER SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present disclosure relates to an interactive product, such as a toy. In particular, the present disclosure relates to an interactive plush toy configured to receive an electronic computing device, such as a tablet computer or smartphone.

BACKGROUND

Different types of interactive toys exist. However, a need remains for improved interactive toys capable of entertaining and/or educating a user utilizing one or more different types of electronic computing devices having a display screen, such as tablet computers or smartphones. In addition, a need exists to provide the public with a useful choice.

SUMMARY

The systems, methods and devices described herein have innovative aspects, no single one of which is indispensable or solely responsible for their desirable attributes. Without limiting the scope of the claims, some of the advantageous features will now be summarized.

An aspect of the disclosure involves an interactive plush toy having a body comprising an outer layer defining an outer surface of the plush toy and an interior space. The body further comprising stuffing within the interior space. A pocket is positioned within or attached to the body. The pocket is configured to receive an electronic computing device having a display screen through an opening of the pocket. At least one display opening is associated with the pocket such that at least a portion of the display screen positioned within the pocket during use is visible from external of the plush toy through the at least one display opening.

In some arrangements, the pocket is adjustable along at least one direction to receive electronic computing devices of different sizes.

In some arrangements, the pocket is adjustable in a width direction.

In some arrangements, the pocket includes a stretch panel that is stretchable in at least one direction.

In some arrangements, a supporting ring surrounds the at least one display opening and configured to maintain a shape of the display opening when the stretch panel is stretched.

In some arrangements, a width of the opening of the pocket is greater than a width of an intermediate portion of the pocket spaced from the opening.

In some arrangements, the plush toy includes one or more lights associated with the at least one display opening.

In some arrangements, the one or more lights comprises a strip of lights at least partially surrounding the at least one display opening.

In some arrangements, the at least one display opening comprises a first display opening and a second display opening positioned one above the other.

In some arrangements, a flap is provided for selectively closing the opening of the pocket.

In some arrangements, the plush toy includes at least one appendage extending from the body.

In some arrangements, the at least one appendage comprises at least one stabilizing appendage configured to contact a surface upon which the plush toy rests and provide support to the body to assist in holding the body in a desired position relative to the surface.

In some arrangements, the at least one stabilizing appendage comprises an internal, bendable support member.

In some arrangements, the at least one appendage comprises at least one interactive appendage, the at least one interactive appendage comprising at least one sensor configured to be connectable to the electronic computing device.

In some arrangements, an accessory is provided that is configured to connect to the electronic computing device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIGS. 5-1 through 5-4 illustrate several different types of pocket design.

DETAILED DESCRIPTION

Figure 1:
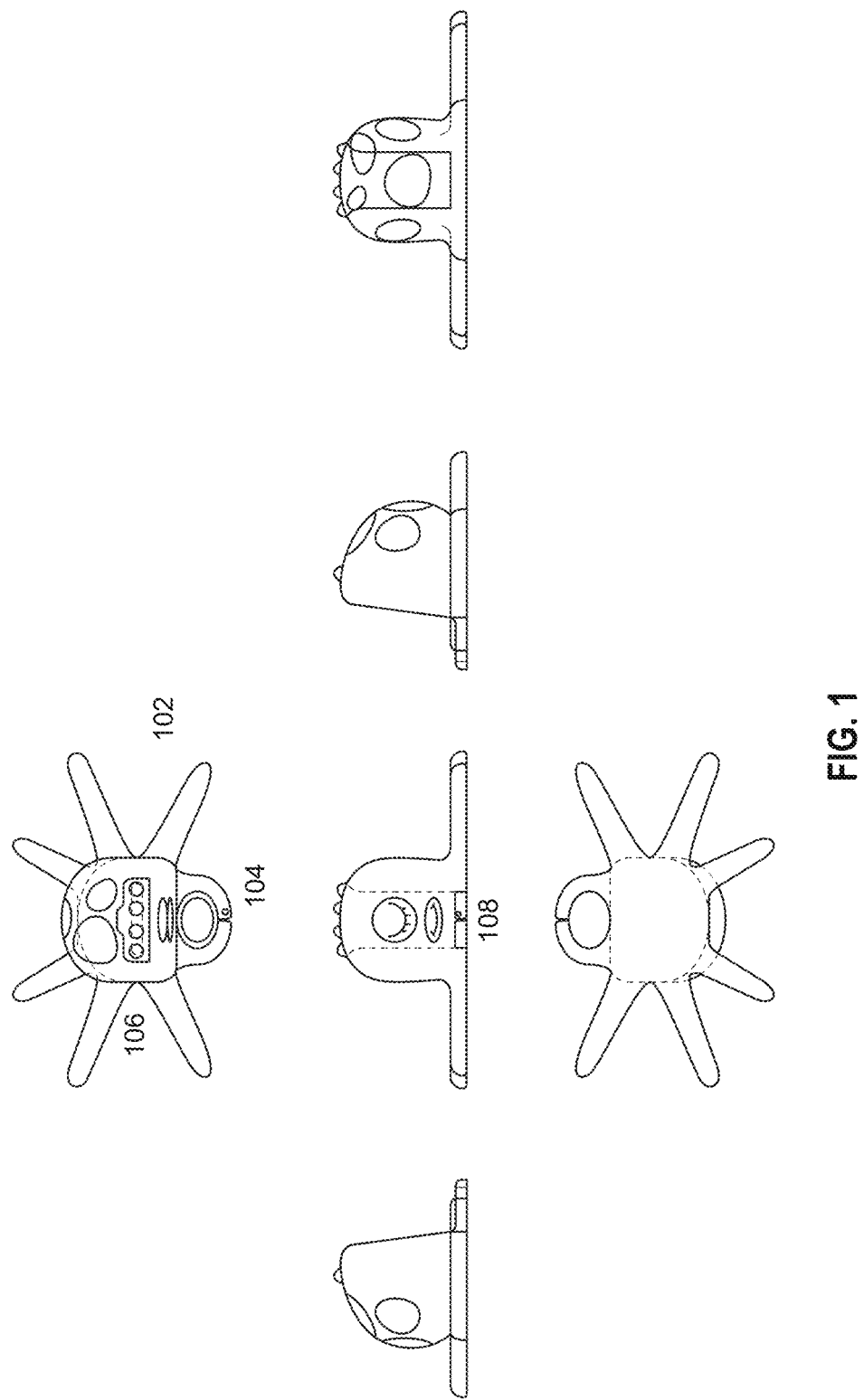
FIG. 1 illustrates several views of an exemplary plush character in the form of an octopus, which is configured to receive an electronic computing device having a display screen, such as a tablet computer or smartphone. For example, the plush may comprise at least one appendage 102. The plush may also comprise a sensor pad 104. The plush may also comprise an opening 106. The plush may also comprise an electronic computing device 108 (e.g., a tablet, a mobile device, and so on as described below).

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

An aspect of the present disclosure involves a smart toy platform including a plush character ("plush" or "product") configured to receive a computing device having a display screen ("electronic screen device"). The plush can be similar to a conventional plush toy (e.g., stuffed animal or other character) having an outer material layer that is filled with a soft stuffing material. However, preferably, the plush includes a receptacle configured to receive the electronic screen device. In some configurations, the plush includes a display opening associated with the receptacle such that, when the electronic screen device is properly positioned within the receptacle, at least a portion of the display screen of the electronic screen device is visible from an exterior of the plush through the display opening. For example, in some configurations the receptacle can be wholly or partially defined by a pocket, such as an interior pocket of the plush.

Certain description below describes functionality being performed by an electronic screen device, by a plush, or by a product. It should be appreciated that the functionality described herein may be performable by either of the device, plush, or product. For example, and as will be described in more detail below, the plush or product may include an RFID reader configured to identify RFID tags on accessories. In this example, the RFID reader may provide information to the electronic screen device regarding identifiers associated with the RFID tags. The electronic screen device may, alternatively or additionally, include an RFID reader. Thus, the electronic screen device may therefore determine the identifiers. In this way, functionality described herein as being performed by the plush or product, may in some embodiments be performed by the electronic screen device.

The plush can be in the form of an animal, character or person, or can be of any other suitable form or shape. In some configurations, the plush has a head portion, which can include a face. The receptacle and/or the display opening can be located in or otherwise associated with the head portion or face of the plush. In some configurations, the display screen can form a portion of the face of the plush, such as eyes and/or a mouth. In some configurations, the plush includes one or more limbs or other appendages (e.g., arm, leg, trunk). As described further herein, one or more of the appendages can include one or more sensors that can communicate with the electronic screen device to allow interaction between the user and the plush/electronic screen device (collectively referred to as the "platform" or "system").

Example sensors may include accelerometers, ultrasonic sensors, vibration sensors, gyroscopes, compasses, barometers, and so on. These sensors may communicate with the electronic screen device via a wired connection (e.g., USB, such as USB Type-C; Thunderbolt; Lighting connections) or wireless connection (e.g., Bluetooth, Wi-Fi, and so on). In some embodiments, the sensors may be connected to a same sensor module. The sensor module may aggregate sensor information and communicate with the electronic screen device via the wired or wireless connection. Optionally, the sensors may inform positions and/or orientations associated the limbs. For example, one or more sensors included in an arm of the plush may be utilized to determine a vector representing the arm's position in three-dimensional space. Optionally, the sensors may indicate adjustments to the appendages. For example, if a user adjusts an arm upwards the sensors may generate information indicating the upward movement.

In some configurations, the character can be formed by something other than a plush toy. For example, the character (or other receiver for the electronic screen device) can be in the form of a rigid body or relatively rigid body in comparison to a plush toy. For example, the character could be formed by a doll, robot or other similar structure. The term "plush" in the present disclosure is used for convenience in describing the illustrated embodiment(s), but is intended to refer to any form of a character or body configured to receive the electronic screen device unless otherwise indicated either expressly or by context. Thus, the term "plush" can be replaced with rigid body, relatively rigid body, doll, robot, character, device, toy, etc.

The electronic screen device can be any type of computing device. Preferably, the electronic screen device includes one or more display screens or other types of visual display. However, in some configurations, the computing device may not include a display screen. In such configurations, the computing device can communicate with a user of the system via auditory or vibratory output, among other possibilities. The computing device preferably includes a memory and a processor, in addition to the display screen. The computing device can also include a communication system, including a receiver and transmitter, that permits the computing device to communicate with other devices and/or the internet. The communication system can permit wireless (e.g., Bluetooth or Wi-Fi) or wired communication between the computing device and other devices or networks (e.g., the internet). The computing device can also include one or more inputs and/or one or more outputs, which can also allow the computing device to communicate with other devices, networks or systems or with users. For example, the computing device may include one or more speakers or microphones. The computing device can be a portable electronic device, such as a smartphone, tablet or other computer. The disclosure herein is directed toward a plush configured to receive a smartphone or tablet computer; however, the disclosure is intended to cover any other suitable computing device.

As described above, the computing device (e.g., a mobile device, tablet, and so on) may comprise a screen (e.g., a touch sensitive screen). In some embodiments, the computing device may generate (e.g., render) elements for presentation via the screen. For example, an application (e.g., an 'app') obtained from an electronic application store may execute on the electronic screen device. In this example, the application may cause presentation of certain visual elements via the screen. Examples will be described in more detail below, and may include a representation of a character's face. The representation may be updated (e.g., in real-time) by the application, such as to appear as in fluid motion. For example, a character's face may be rendered at greater than a threshold refresh rate (e.g., 24 Hz, 30 Hz, 60 Hz, and so on). In this way, the character's face may create facial expressions, output words, and so on. As will be described, the character's face may be updated in response to user actions, sensor information, and so on as will be described.

Optionally, the plush may comprise, or receive, an electronic screen configured to present visual elements received via a network (e.g., a local area network, a wide area network, the internet). The electronic screen may include, as compared to a tablet, more limited functionality and processing power. In this example, the screen may receive wireless network information from an outside user device or system. The screen may extract the visual elements from the wireless network information, and present the visual elements. For example, the electronic screen may include one or more processors, or specific processing units (e.g., Application-specific integrated circuits), configured to extract the visual elements. Optionally, the electronic screen may be paired with the outside user device or system, such that the electronic screen may disallow presentation of visual elements received from other user devices or systems. Similarly, the electronic screen may ensure that received wireless information is authorized to be presented via the electronic screen. As an example, the wireless information may comprise a unique identifier associated with an authorized application executing on an outside user device or system. As another example, the wireless information may include information signed based on a private key associated with an authorized entity. In this way, the plush may optionally utilize lower-cost electronic screens to implement the functionality described herein.

In some configurations, the platform includes an integrated game controller and open-ended, replayable content. For example, the platform can include a plush (as the controller), apps and storybooks. In one embodiment, the plush is generally in the form of an octopus and can be named and/or sold under the trademark Octobo™. The Octobo™ plush has a face pocket to hold a mobile electronic screen device to bring the Octobo™ character to life—but it can be played with and without the device. The app displays different emotions of the Octobo™ character according to how a user interacts with it. Inside the storybook, parents and kids can read about adventures of the Octobo™ character and find interaction prompts and interactive detachable pieces inside.

The integrated game controller allows the user to interact directly and emotionally with the toy like one would with a pet and not control it via a technology interface. Preferably, the platform provides for updating content, which allows the user (e.g., a child) to further develop a personal bond with the toy. In at least some embodiments, the platform blends physical and digital interaction, and adds an emotional element. In some configurations, the smart toy platform has a digital content library where users can browse and download age-appropriate customize content from the library.

I. Construction of Interactive Plush

A. Adjustable Pocket and Head Flap

In some configurations, the plush includes a pocket that forms a portion or an entirety of a receptacle configured to receive the electronic screen device. The pocket is also configured to support the electronic screen device in an appropriate location relative to the display opening(s) of the plush, which permit the display screen of the electronic screen device to be viewed from the exterior of the plush. Some configurations of the pocket can be adjustable or otherwise adaptable such that the same plush can accommodate a plurality of electronic screen devices having dimensions that vary relative to one another and to support the electronic screen device in an appropriate position relative to the display opening(s). For example, to allow the pocket in the plush to hold different sizes of mobile device snugly, the plush may include one of the 5 different designs for the adjustable pocket described below. Other configurations can combine features from different ones of the pocket designs described below.

1. Stretch Pocket

Figure 3:
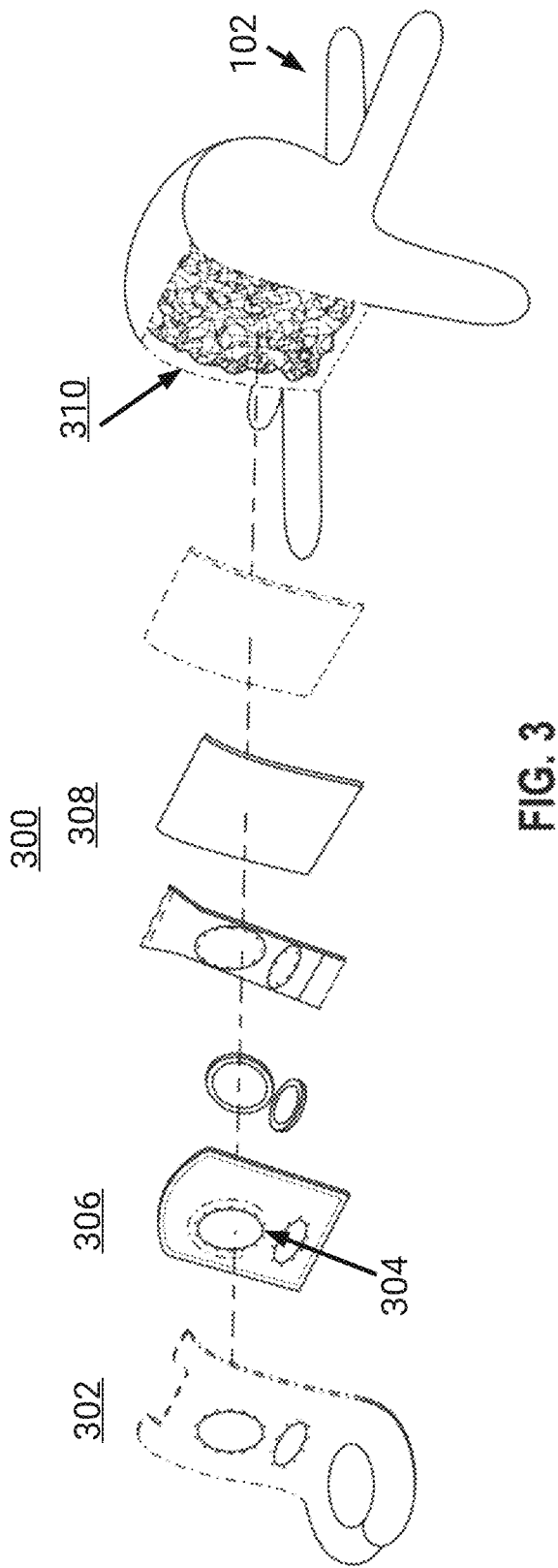
FIG. 3 is an exploded view of the plush character of FIG. 1 showing one type of pocket design.
Figure 4:
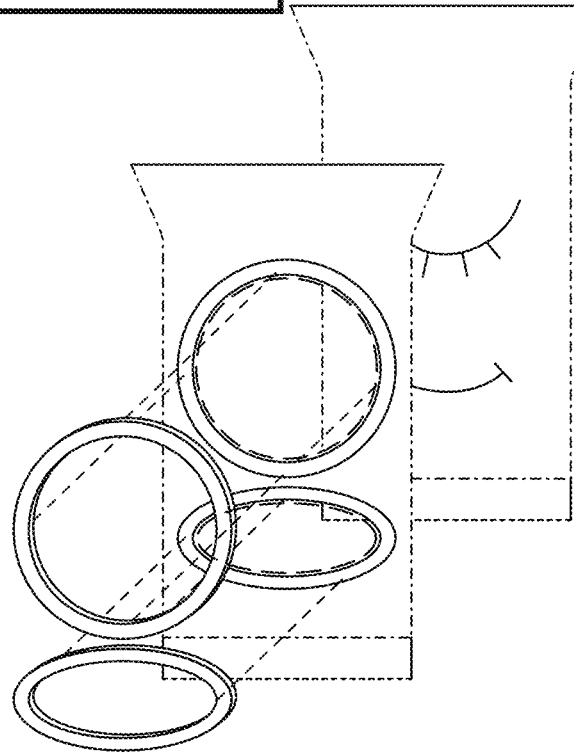
FIG. 4 is an enlarged, exploded view of a portion of the pocket of FIG. 3.

FIGS. 3 and 4 illustrate the construction of a portion of a plush 300 that incorporates an embodiment of a stretch pocket. Using a stretchy material for the pocket, with a wider, curved opening, different sized devices are able to smoothly slide into the pocket for a secure fit inside the plush. In the illustrated configuration, the pocket includes an outer facing fabric layer 302, which can define an outer surface of the plush 300. The outer facing fabric layer 302 defines one or more display openings 304, which allows at least a portion of the display screen of the electronic screen device positioned within the pocket to be visible from the exterior of the plush 300. In the illustrated arrangement, the outer facing fabric layer 302 includes a pair of display openings 304. The display openings 304 are located one above the other. One display opening is circular and one display opening is an elongate oval. The circular display opening is located above the elongate oval opening. However, in other configurations, other numbers and/or shapes of display openings can be provided, such as one, three, four, five, six or more rectangular, square, triangular or other shaped openings. The display openings 304 can be covered by a partially or fully transparent material or can be open to provide direct access to the display screen of the electronic screen device. If the display openings 304 are covered, a suitable conducting material can be used to retain the functionality of the (e.g., capacitance) touch screen of the electronic screen device.

The outer facing fabric layer 302 can also define one or more (e.g., two) appendages (e.g., legs) 102, which can include internal stuffing 310 to provide a suitable amount of volume to the legs. The legs can be curved. In some configurations, the legs meet at their respective ends to create a partially or fully enclosed space. In other configurations, the legs could overlap one another instead of meeting at the ends.

In some configurations, the plush 300 can also include an optional stuffing and/or LED pouch. The pouch can be located interior of the outer facing fabric layer. For example, the pouch may be formed between layers 306-308. In some configurations, the pouch can be adjacent to the outer facing fabric layer 302. The pouch can include two adjacent walls (e.g., 306-308) that accommodate stuffing in between. The pouch can provide padding in front (on the exterior side) of the electronic screen device. The pouch includes display openings 304 that correspond to the display openings of the outer facing fabric layer. The pouch can also or alternatively contain or otherwise support one or more lights. In the illustrated arrangement, multiple LED lights at least partially surround the upper display opening of the pouch. The LED lights may be in the form of an LED light strip. In some configurations, the LED lights can fully surround one or both of the display openings, individually or together. In some configurations, the relevant display opening of the outer facing fabric layer can be larger than the corresponding opening of the pouch such that the LED lights are visible through the display opening of the outer facing fabric layer. In other configurations, the display openings can be the same size and the LED lights can be visible through the material of the outer facing fabric layer that surrounds the display opening(s).

The plush can also include a stretch pocket, which can include adjacent forward and rearward walls that define a receptacle for the electronic screen device therebetween. The forward and rearward walls are constructed from a stretchable material. The stretchable material can be stretchable in one or two directions. Preferably, the stretchable material is stretchable in at least a width direction in use. With such an arrangement, the bottom of the pocket can properly locate a number of different sized electronic screen devices in the vertical direction and the pocket can stretch to accommodate the width of the particular electronic screen device. The stretchable pocket can stretch evening to properly center electronic screen devices of different width within the pocket. The stretchable material is more stretchable than the material of the outer facing fabric layer and/or the pouch. In some configurations, the stretchable material has sufficient stretch to appropriately (snugly) accommodate the smallest intended electronic screen device in a nonstretched condition and the largest intended electronic screen device in a stretched condition. A suitable amount of stretch can be at least about or about 15%, 25%, 30% or 50%.

In some configurations, the pocket is generally rectangular in a nonstretched condition. The pocket can be oriented with the longer sides of the rectangular pocket aligned in the height direction and the shorter sides aligned in the width direction. In the illustrated arrangement, the upper end of the pocket is wider than the lower end of the pocket. In particular, the upper end portion of the pocket flares outwardly. The width of the upper end of the pocket can be at least about or about 15%, 25%, 30% or 50% greater than the width of the lower end. In some configurations, the width of the upper end of the pocket can be substantially similar to a maximum stretched width of the lower portion of the pocket below the upper end portion. The wider upper end of the pocket allows larger electronic screen devices to be inserted into the pocket with no stretch or minimal stretch of the upper end.

The forward and rearward walls of the pocket can be sewn to one another along the sides and bottom. In some configurations, the bottom end of the pocket, below the receptacle portion, can be sewn to the bottom outer panel or layer of the plush. The forward wall of the pocket includes display opening(s) that correspond to the display openings of the pouch and/or the outer facing fabric layer. Preferably, each display opening includes a reinforcement member or structure that maintains a shape of the opening when the stretchable material of the pocket is stretched. Thus, the size, shape and/or location of the display openings can be consistent despite stretching of the pocket. The reinforcement structures can be of any suitable arrangement, such as a non-stretch or rigid material rim or bead around the display opening(s). In some configurations, the reinforcement structures are constructed from a plastic material.

The plush can also include a foam sheet or batting layer positioned behind or to the interior of the pocket. A divider layer can be positioned between the foam sheet or batting (if present) and the stuffing of the plush. The divider can be a layer of any suitable fabric material.

Figures 1, 5:
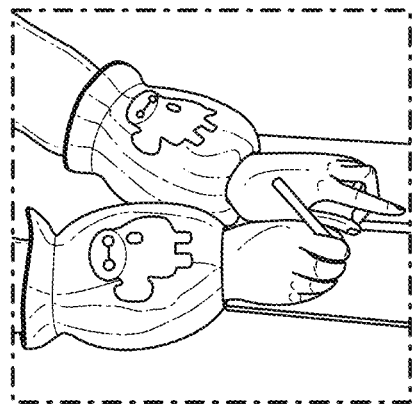
Figures 2, 5:
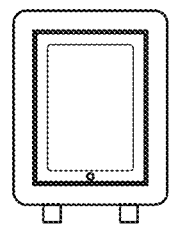
Figures 3, 5:
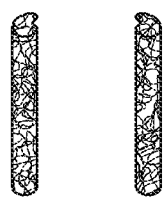
Figures 4, 5:
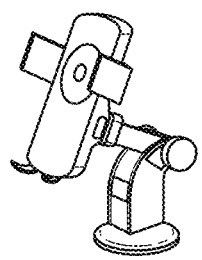

Other suitable arrangements for accommodating different sized electronic screen devices within the plush can also be used. Preferably, the different sized electronic screen devices are properly located relative to the display opening(s). FIGS. 5-1 through 5-4 illustrate several example arrangements for the electronic screen device receptacle or pocket.

2. Elastic Band

FIG. 5-1 illustrates elastic or otherwise length-adjustable band, ring or loop on the top, middle and/or around the pocket to hold different devices tightly. FIG. 5-1 includes a photograph of an example drawstring adjustment device. Such drawstrings may be elastic or may be relatively inelastic and include an adjustment mechanism (e.g., a lock mechanism) to allow an effective loop portion of the drawstring to be adjusted in length (e.g., perimeter or circumference). FIG. 5-1 also includes a schematic drawing of one or more (e.g., a plurality of) elastic or inelastic bands, rings or loops surrounding the pocket in a width direction (extending around a lengthwise axis). The schematic drawing illustrates a first band at the upper end of the pocket and a second band between display openings in a middle or intermediate portion of the pocket. However, the bands could be in other locations and/or additional bands could be provided. FIG. 5-1 also includes a schematic view of a band that partially encircles the pocket along the sides and the bottom. In other configurations, the band could also extend along the top of the pocket as long as an opening to insert the electronic screen device is also provided.

3. Device Case

Figure 2:
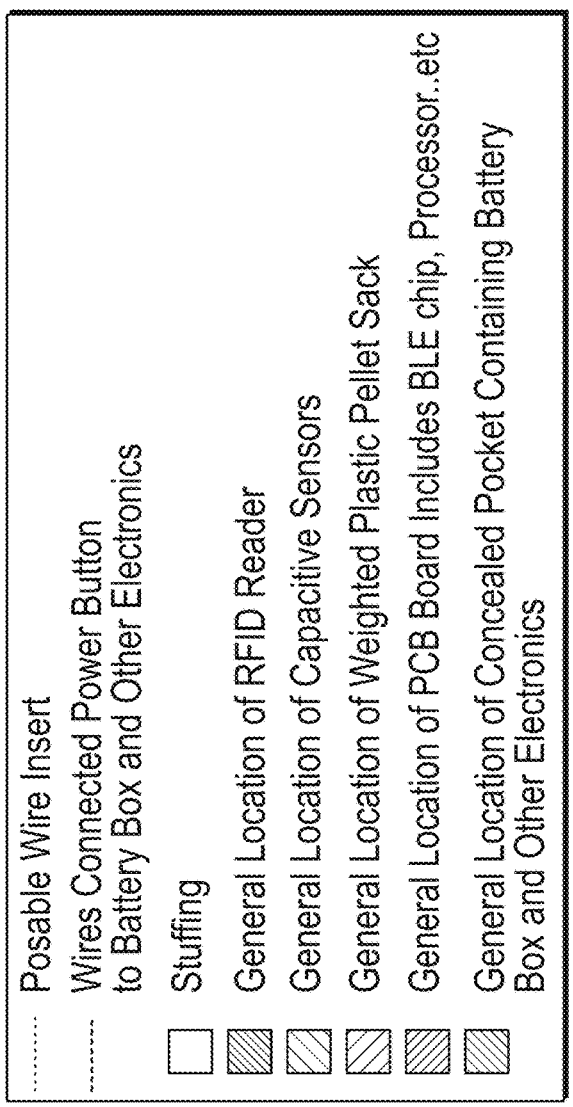
FIG. 2 illustrates several views of the plush character of FIG. 1 with certain interior features shown.
Figure 2:
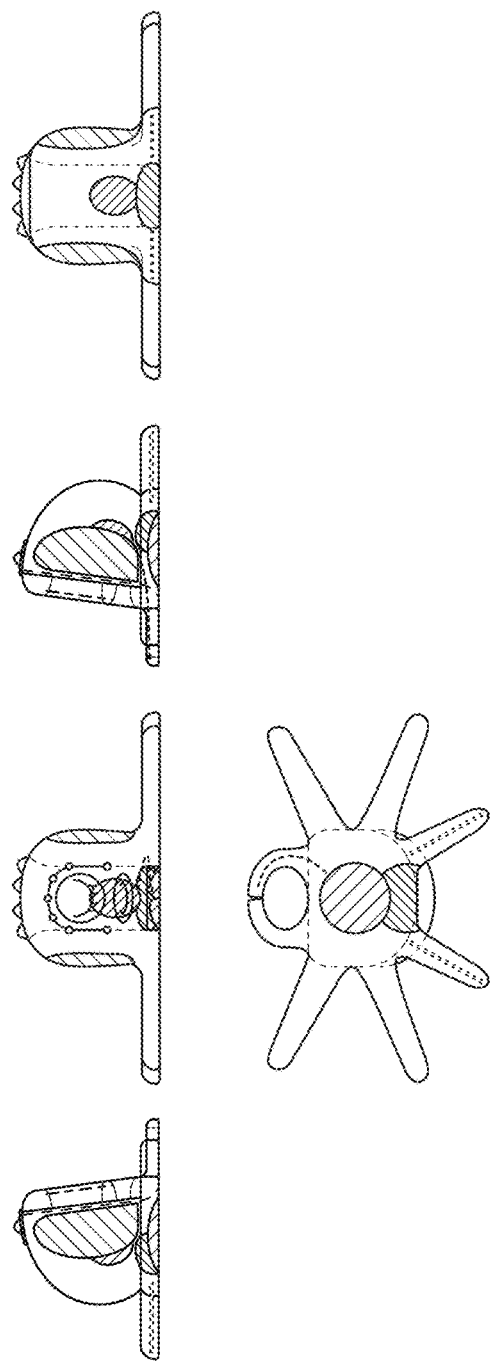

FIG. 5-2 illustrates an arrangement that provides an external device case for different sized devices to make all devices the same exterior size (once placed in the case) before putting in the plush. Different inserts (e.g., foam inserts), dividers or other arrangements for taking up excess space within the device case can be provided to allow the device case to work with any number of electronic screen devices.

4. Foam Bars

FIG. 5-3 illustrates foam bars to securely fill the space between the device and pocket. The bars can be positioned on the sides, top and/or the bottom of the device. In some configurations, as described above, the bottom end of the pocket can establish the vertical position of the electronic screen device regardless of size. Gravity, frictional forces or other restraints can maintain the electronic screen device against the bottom end of the pocket. Thus, the foam bars are provided only to properly align the electronic screen device in a width or side-to-side direction in the pocket. An equal number of foam bars can be places on each side of the electronic screen device within the pocket, as necessary. Materials other than foam can also be used, such as stuffed fabric bars, plastic, etc.

5. Adjustable Holder

FIG. 5-4 illustrates a mechanical case that fits around the device securely and provides a consistent exterior size for all devices. The mechanical case can include adjustable contact members that contact opposing sides of the electronic screen device. For example, the case can include a base or back portion that defines an appropriate width and/or length dimension relative to the pocket. The case can also include side opposing contact members configured to adjust equally relative to a vertical centerline of the base or back portion to center the electronic screen device in a width direction of the base or back portion. The case can include similar top and bottom contact members. Or, similar to other arrangements discussed above, the bottom (or top) contact member can be fixed and the top (or bottom) contact member can be adjustable. Thus, the bottom (or top) contact member can establish a consistent vertical position of the electronic screen device regardless of size.

6. Closing Flap

Figure 6:
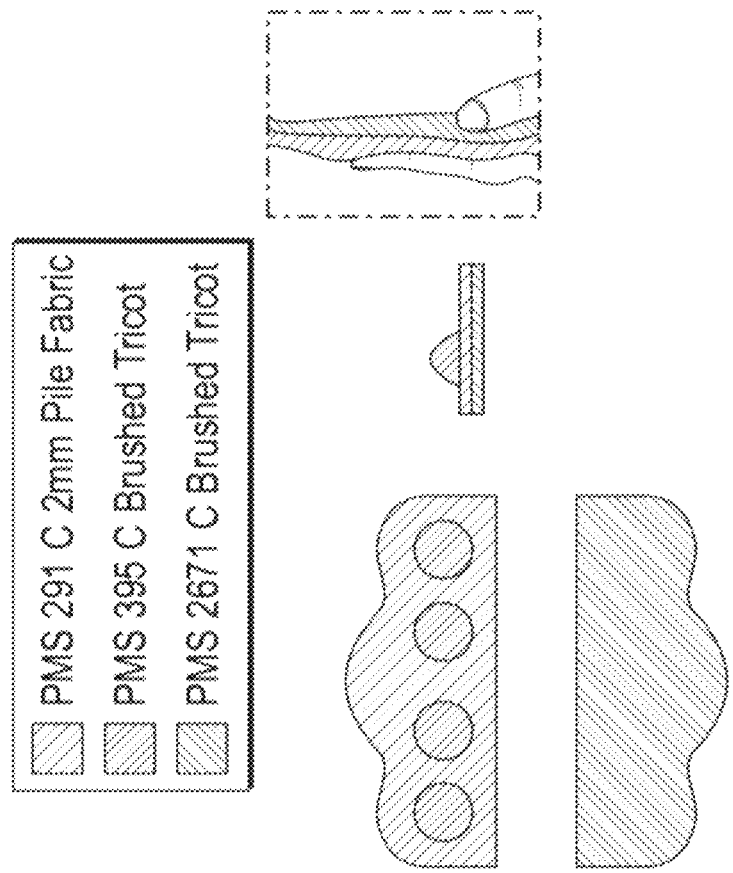
FIG. 6 illustrates several views of a flap for selectively closing an opening of the pocket.
Figure 6:
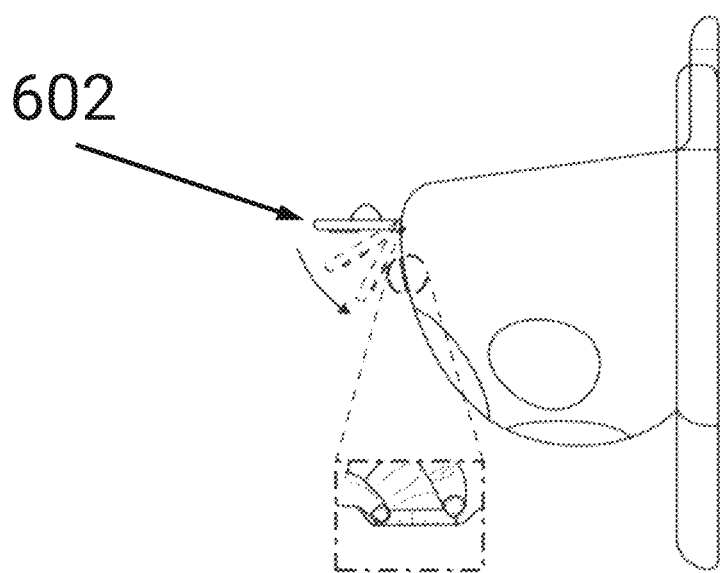

FIG. 6 illustrates a closure for the pocket. In particular, the opening 602 of the device holder pocket is covered securely by a closing flap in the illustrated arrangement. The closing flap can be secured to the main body of the plush adjacent the opening of the pocket along one edge, such as an edge aligned with the width direction of the pocket. The closing flap can fold or rotate upwards to expose the opening of the pocket and downwards to cover the opening of the pocket. A free edge of the closing flap opposite the fixed/secured edge can be securable to the main body of the plush. The closing flap, due to its size and flexibility, will be able to contain the device regardless of device size. In some configurations, the closing flap has a width that is significantly greater than a corresponding depth of the pocket, such that the free edge of the closing flap can still contact and be secured to the main body of the plush even if the electronic screen device protrudes to some extent above the upper opening of the pocket. Preferably, the closing flap has a length that is greater than a corresponding width of the pocket such that the flap fully covers the pocket when in a closed position.

B. Interactive Arms—Tilt, Press, Capacitive

1. Detection

Figure 8A:
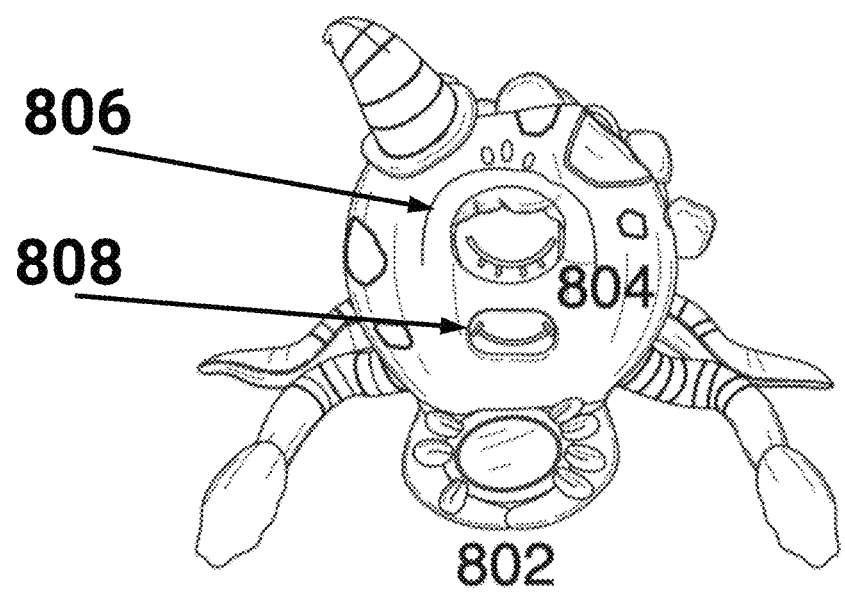
FIGS. 8A and 8B illustrate front and side views, respectively, of a plush, which can include any combination of the features described with respect to FIGS. 1-7 or elsewhere herein.
Figure 8B:
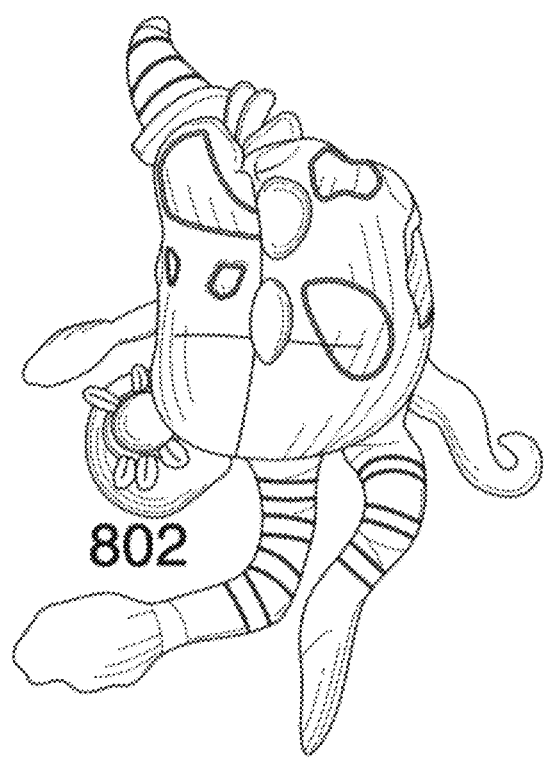
Figure 9A:
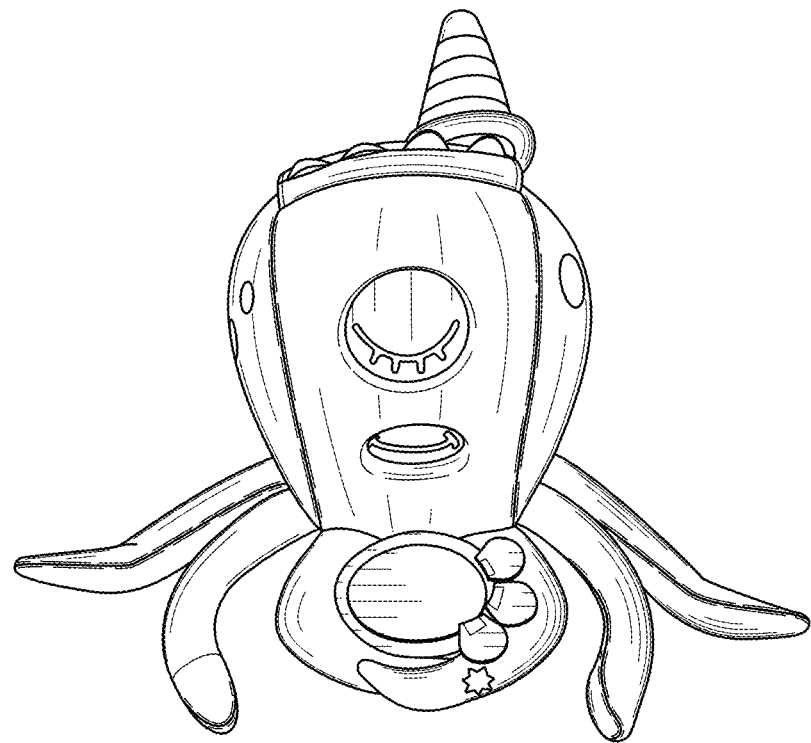
FIGS. 9A and 9B illustrate front and side views, respectively, of another plush, which can include any combination of the features described with respect to FIGS. 1-7 or elsewhere herein.
Figure 9B:

The product's interactive arms are used to detect player interaction. The plush can include one or more interactive arms (e.g., 2, 4, 6 or 8 interactive arms). For example, the plush illustrated in FIGS. 8-9B. In some configurations, not all of the arms are interactive arms. Using tilt, press, force, and/or capacitive touch sensors, the arms can differentiate interactions such as a shake, wiggle, hold, clap, touch, bend, or directional movement (up, down, left, right and combinations thereof). For example, one or more capacitive touch sensors may be embedded in each interactive arm. When one arm detects a touch that continues for a predetermined period of time, that can be a "hold" action. Or when both arms detect each other, that can register as a "clap" action. Other similar user actions or interactions with the arms can be detected. Preferably, the detected interactions are communicated to the app running on the electronic screen device, which can utilize this information for interacting with the user(s) of the system. Optionally, information generated by the capacitive touch sensors may be provided to the app. The app may then determine, for example, the "hold" action, "clap" action, and so on.

2. Detection of Different Arms

The plush can detect which of the interactive arms the signals have come from, simultaneously and in real time. This is a result of each interactive arm having its own set of sensors that can detect signals independently of other arms.

C. Touch Arms (e.g., Arms can Work with Touch Screens)

Touch arms are the interactive arms that can interact with touch screens. Applying a conductive material (e.g., the thread or paint used on touch screen enabled gloves) to the arm(s) enables the arms to activate controls on a capacitive touchscreen. The user can swipe, touch, move, poke and interact with the electronic screen devices with the touch arms. The touch screen will be able to know how many points are touched and the location of the touch, and then respond accordingly. For example, the app may ask the user to use one of the plush arms to touch the plush's nose, as displayed on the electronic screen device. The app then can sense that one did in fact touch the nose, and did so using a specific arm. For example, the app may identify a location associated with the touch. This location may then be correlated to the visual depiction of the plush's nose.

The plush can detect which of its arms is interacting with the screen. As an example, the plush may utilize the sensors to determine which of the arms is being manipulated by a user. The manipulated arm may be assumed to be the arm interacting with the screen. As another example, the plush may utilize the sensors to determine orientation information associated with the arms. If an arm is determined to be bent towards the screen, the plush may identify the arm as interacting with the screen. Optionally, each arm may comprise a unique arrangement of conductive material on the arm. For example, a different sized area of conductive material may be utilized. In this example, the plush may identify the arm interacting with the screen based on the size of interaction. The plush's arms can additionally be both interactive arms and touch-sensing arms at the same time.

D. Supportive Elements—Bendable

Figure 7:
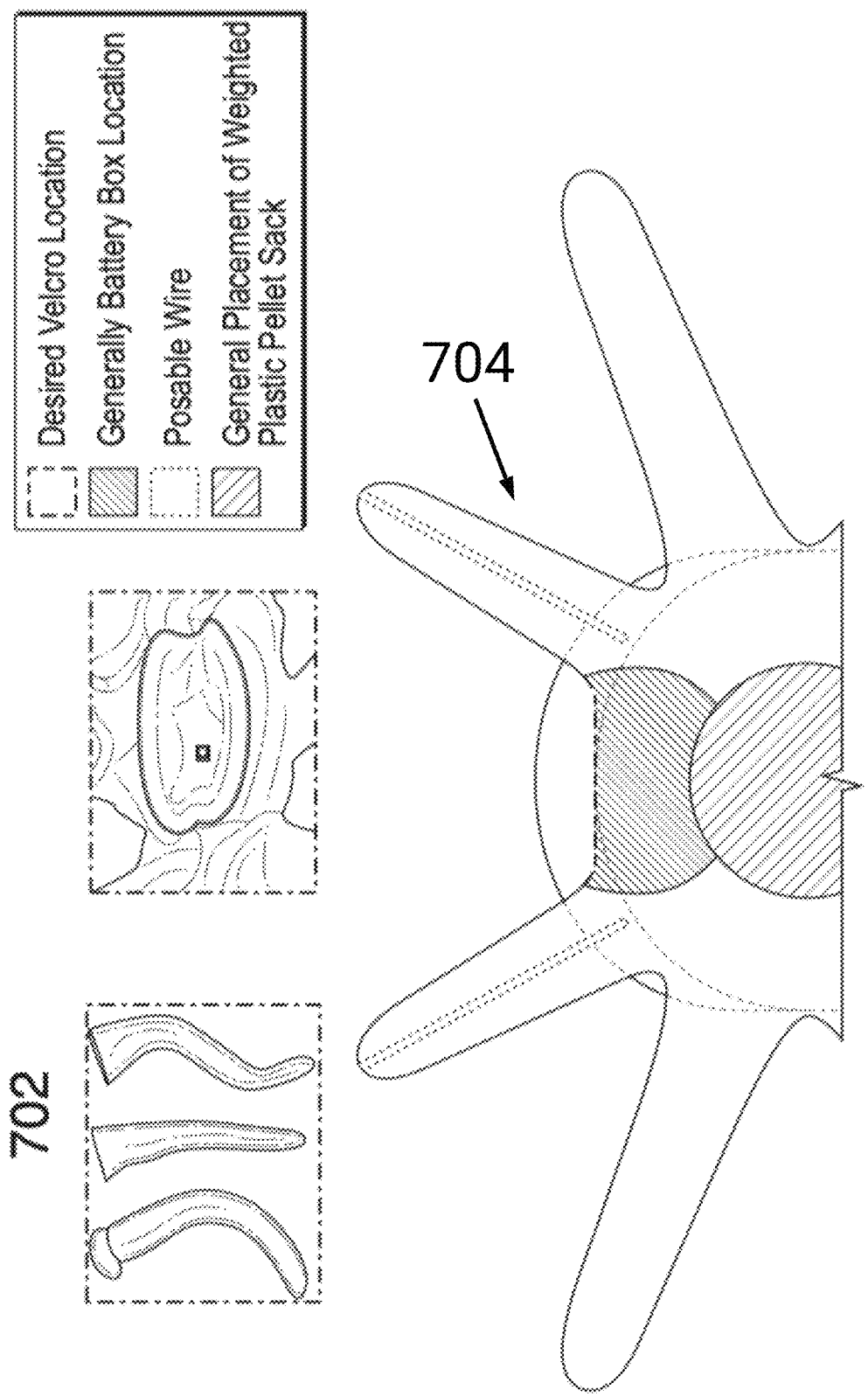
FIG. 7 illustrates several views of the plush character of FIGS. 1-6, including a partial top view illustrating stabilizing and other arms of the plush character.

FIGS. 2 and 7 illustrate supportive arms of the plush. For example, one or more arms can be configured to help support the main body of the plush in an upright (or other desired) position. Thus, at least a portion of a length of the supportive arm(s) can be relatively rigid or sufficiently rigid to support the main body of the plush in response to ordinary or expected forces encountered during normal use. For example, the supportive arm(s) can be positioned toward or at the rear of the main body of the plush generally opposite the pocket to resist forces of a user pushing against the screen of the electronic screen device positioned within the pocket. In some configurations, wired inserts (e.g., inserts 702 in stabilizing appendage 704) are added within the plush to give it support structure. The plush can be repositioned, and due to the wires, hold their shape in the new position. The support wires can be relatively stiff, but bendable such that the wires can be manually bent by a user and hold a shape once bent. The wires can be positioned within the main body of the plush and/or within appendages (e.g., arm or leg) of the plush. For example, a length of the wire can extend in a lengthwise direction along the appendage. The wires can permit a user to bend or shape an appendage as desired, such as to support the main body in a desired orientation.

E. Accessories/Sensor Pad (e.g., RFID)

In some configurations, sensor pads are built into the product to detect objects with which the sensor pad interacts. Optionally, the sensor pad may be the sensor pad 802 or sensor pad 902 illustrated in FIGS. 8A-9B. In some embodiments, the sensor pad may be a sensor area. The sensor area may encompass different portions of the plush. Additionally, sensors may be spread throughout the pad instead of in a pad. One such type of sensor pad is RFID. For example, the plush can include one or more RFID readers and antennas, which can communicate with the electronic screen device via a suitable electronic connection. Accessory objects can be provided with unique RFID tags so that the plush can detect the presence of the accessory object and can identify the particular object based on the unique RFID tag. In some configurations, the sensor pad can be located within a space defined by the curved front arms. Other suitable sensors types can also be used.

An example accessory, which is described in more detail below, includes a token associated with an interactive story. The token may represent an object, character, letter, and so on, which is associated with the interactive story. A user, such as a child, may read the interactive story (e.g., a book, a story on a user device, and so on), and the interactive story may include one or more references to tokens. The user may place a referenced token proximate to the sensor pad (e.g., on the sensor pad, or within a threshold distance of the sensor pad). In response, the electronic screen device may receive information identifying the placed token. A display of the electronic screen device may then update based on the placed token. For example, a first portion of the display may comprise a character's face. The character's face may therefore update, such as to make a facial expression, speak, present graphics, and so on. Optionally, a second portion of the display may comprise additional visual elements. The second portion may alternatively, or additionally, be updated. For example, the second portion may include a graphical depiction of a map, depictions of characters referenced in the story, and so on. The second portion may optionally provide instructions, or information, to a user. For example, the information may relate to a story being read, or a TV show being watched, by the user.

The above-described tokens may be associated with particular identifiers, such as identifiers stored in RFID tags, Bluetooth beacons, bar codes included on the tokens, and so on. The user may place one or more tokens on the sensor pad, and the sensor pad may thus detect the associated identifiers. With respect to the example of RFID tags, the sensor pad may utilize an RFID reader to identify the identifiers. With respect to the example of Bluetooth beacons, the sensor pad may utilize a Bluetooth reader to identify identifiers being broadcast via the Bluetooth beacons. With respect to the example of bar codes, the sensor pad may comprise, or cause activation of, a camera. For example, the bar codes may be imaged via a camera included in the electronic screen device. In this example, the camera may be utilized to detect the bar codes, QR codes, and so on.

Optionally, sensors included in appendages (e.g., arms) of the plush may be leveraged in addition to accessories. As an example, a token placed proximate to the plush may cause the electronic screen device to present a particular visual display (e.g., an animation, visual elements, and so on). In this example, a user of the plush may adjust the appendages of the plush. For example, an interactive story may include language requesting the user to raise two or more appendages of the plush (e.g., raise the hands of the plush in the air). Thus, the electronic screen device may determine whether the appendages have been raised. Upon a positive determination, the electronic screen device may update the display to indicate success.

As another example of an accessory, the plush may respond to the placement of different costumes on the plush (e.g., over the plush). In this example, the plush may comprise a particular RFID tag indicating a type associated with the plush. Examples type may include a particular character, a particular type of animal, magical creatures, and so on. As described above, an electronic screen device may execute an application which causes presentation of visual elements (e.g., a character's face). Thus, the electronic screen device may output a face associated with the particular character based on an identifier associated with the particular RFID tag. A user may obtain different costumes, or outfits, and place these costumes on the plush. For example, a costume may include a hat. As another example, a costume may include a sweater or sweatshirt. As another example, a costume may include a glove, shoes, and so on.

Each of the above-described example costumes may be associated with an identifier, such as via an RFID tag. As described above, the plush may include an RFID reader. In this way, the plush may determine an identifier associated with a costume placed on the plush. The electronic screen device may then obtain the identifier, for example via a wireless or wired connection. Optionally, the electronic screen device may determine the identifier utilizing an RFID reader, Bluetooth elements, camera, and so on. The application executing on the electronic screen device may adjust presentation of the display based on the identifier. For example, the plush may be a particular video game character. In this example, the electronic screen device may present a face associated with the video game character (e.g., a dynamically updated face). When a costume is placed on this example plush, the face of the video game character may be similarly adjusted. For example, the costume may be a particular suit the character may wear in the video game to obtain special powers or techniques. Thus, the character's face may be updated to reflect the character's in-game visual appearance. Optionally, a second portion of a display of the electronic screen device may reflect information (e.g., the special powers or techniques, a map of a game world associated with the video game, and so on).

Similar to the above-discussion regarding tokens, the electronic screen device may leverage sensors included in the plush's appendages. For example, a costume may be a cape placed on the back of the plush. As a user moves the plush about a real-world environment, the electronic screen device may update the display. As an example, virtual hair of the plush's face may be moved according to a speed, directionality, and so on, of the plush. As another example, a costume may be a shovel attached to one or more appendages of the plush. The plush may detect a rapid movement of the appendages that cause the shovel to perform a digging action. The electronic screen device may optionally update to present dirt, sand, and so on, flying in a character's face. For example, the substance presented on the display may be based on an interactive story, or television show, a user is reading or watching.

Further examples of accessories may include a skateboard, roller-skates, car, and so on. In these examples, the electronic screen device may utilize sensor information from sensors of the plush to vary presentation of the device. A user may place the plush on a skateboard, and cause the plush to be moved about a real-world area. The display of the device may update accordingly. For example, wind may be visually shown on the display. Additionally, a background behind a face associate with the plush may be updated based on the movement. As an example, a city background may be adjusted based on movement of the plush. As another example, rain may be shown on the display with the rain's appearance being modified based on movement of the plush. Optionally, the rain may be presented based on a determination that it is raining near the user. For example, the electronic screen device may obtain weather information from a particular source (e.g., over the internet).

In some embodiments an accessory may include one or more sensors and be configured to provide sensor information to the plush and/or to the electronic screen device. With respect to the example above of a car, the plush may be placed on a seat or bench of the car (e.g., a miniaturized car). In this example, a user may move the car about a room. The electronic screen device may present a moving cityscape in the background, and optionally illustrate a face of the plush as being within a car. Optionally, the car may include sensors such as accelerometers, gyroscopes, magnetometers, and so on. These sensors may be utilized, at least in part, to update the display. For example, if the car is moved over rough terrain the electronic screen device may be updated to reflect jostling of the car. Optionally, a sensor within a wheel of the car may be utilized to detect fine distinctions regarding a type of ground on which the car is placed.

Optionally, an accessory may include a particular play setting. Different play settings may include respective RFID tags. Thus, customization of the display may be based on an RFID tag. For example, a physical structure (e.g., a castle) may be utilized to play with the plush. In this example, the display may be updated to reflect use of the castle (e.g., a crown may be placed on a face presented on the display). As will be described, augmented reality functionality may be leveraged. For example, a user device (e.g., tablet, mobile device) may utilize augmented reality application programming interfaces (APIs) to present virtual content around a real-world location of the plush. If the plush is located in a particular play setting, the virtual content may be dependent on the play setting. For example, and with respect to the castle, the virtual content may include horses, castle markets, dragons, and so on.

It should be appreciated that certain techniques to transmit unique identifiers may be included in small packages and with reduced cost. For example, RFID stickers may be placed on disparate items and utilized to identify the item (e.g., uniquely identify, identify a type of the item, and so on). Similarly, bar codes or QR codes may be placed on items. In some embodiments, RFID stickers may be obtained by users. The users may then place the RFID stickers on objects (e.g., household objects). As an example, an RFID sticker may be associated with a toothbrush. Thus, a user may place the RFID sticker onto a toothbrush (e.g., a handle, or lower portion of the toothbrush). The RFID sticker may be associated with an identifier reflecting a toothbrush or a type of toothbrush. For example, the RFID sticker may be sold with instructions indicating it is to be placed on a toothbrush. The plush may be configured to detect the RFID sticker, and the electronic screen device may then update presentation based on the sticker. For example, the plush may utilize its RFID reader to detect the identifier. In some embodiments, the plush may then communicate (e.g., over a wired or wireless connection) with the electronic screen device to provide the identifier or information identifying a type of object (e.g., toothbrush).

Optionally, the RFID sticker may indicate (1) a type of object and (2) a unique identifier. Thus, in this example multiple RFID stickers may be placed on respective toothbrushes of different users. The electronic screen device may associate the different unique identifiers with the different users. In this way, the electronic screen device may record interactions with the objects. For example, the electronic screen device may monitor times at which a user utilizes his/her toothbrush based on detection of the user's RFID sticker. As will be described below, the electronic screen device may generate an interactive report for presentation to one or more other users (e.g., parents). An example interactive report may be presented via an application on a user device, may be presented (e.g., rendered) as a web page, and so on. Thus, these other users may utilize the interactive report to rapidly ascertain summary information associated with an object's use.

In some embodiments, the RFID stickers may be solely associated with unique identifiers. For example, a particular user (e.g., parent) may obtain a multitude of RFID stickers. The particular user may then move an RFID sticker within a threshold distance of the plush to cause detection of its unique identifier. Utilizing a user device (e.g., a mobile phone, a tablet, a wearable device, and so on), the particular user may cause association of the RFID sticker with a particular type of object. For example, the user device may present an indication of available types of objects (e.g., a toothbrush, a stuffed animal, a book or specific book, a user device, and so on). The user may interact with the user device to select a particular available type. The user device may then cause association of the unique identifier with the type of object. Optionally, the user device may provide the information for storage in the plush, or may update a user profile associated with the particular user. Optionally, an outside system may store user profile information, and an electronic screen device inserted into a plush may obtain the user profile information. In this way, the RFID sticker may be detected by the plush and an associated object type identified.

The plush may thus detect a real-world object based on an RFID sticker. In some embodiments, the electronic screen device may adjust the visual elements presented on the display based on the RFID sticker. With respect to the example of a toothbrush, a user may locate the plush proximate to the user's toothbrush. Thus, the plush may detect the toothbrush based on the RFID sticker. Optionally, the plush may confirm that the user is going to utilize the toothbrush. In some embodiments, the electronic screen device may respond to voice commands. For example, the electronic screen device may include functionality to parse and understand language. As another example, the display may provide received verbalized speech to an outside system for processing. Thus, the user may verbally indicate that the user is going to utilize the toothbrush. As the user utilizes the toothbrush, the display may update to reflect use of a toothbrush. For example, a face associated with the plush may be updated to reflect an animation of brushing teeth. Optionally, the plush may respond to sensor information. For example, prior to brushing the plush may request (e.g., verbally) that the user manipulate an appendage of the plush to mimic brushing. The plush may then determine, based on sensors included in an appendage, whether the appendage is being moved in approximately a pattern similar to that of brushing.

Figure 10:
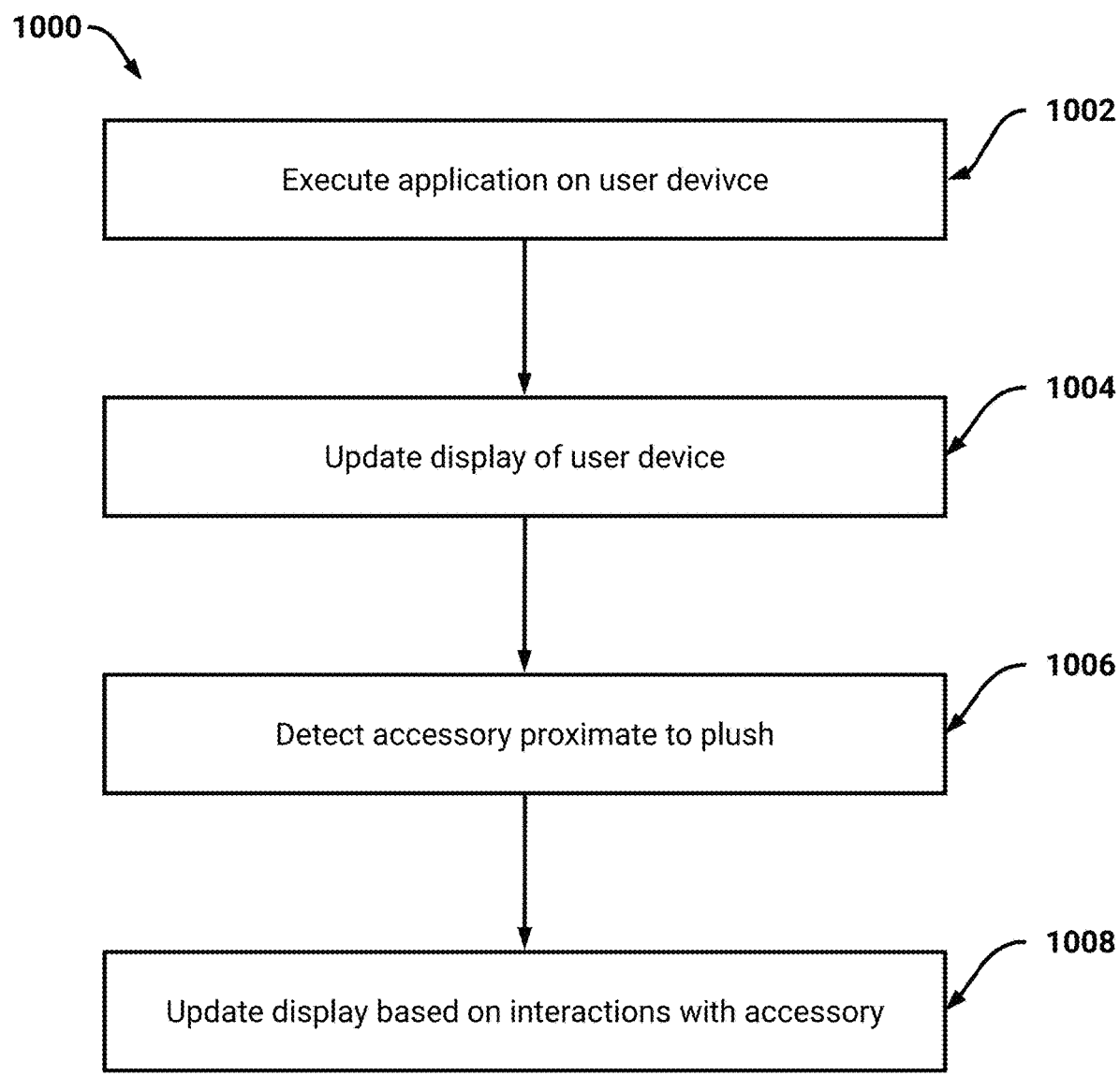
FIG. 10 illustrates a flowchart of an example process for updating presentation of an electronic display based on interactions with accessories.

FIG. 10 illustrates a flowchart of an example process for updating presentation of an electronic display based on interactions with accessories. For convenience, the process will be described as being performed by a user device of one or more processors (e.g., a tablet, a mobile device, and so on, such as the electronic screen device described above).

At block 1002, the user device executes an application. As described above, an application may be obtained from an electronic application store. At block 1004, the user device updates the display. As described above, the user device may present one or more visual elements. For example, a face corresponding to a particular character may be presented. In this example, the face may therefore represent a face of a plush in which the user device is inserted.

At block 1006, the user device detects an accessory proximate to the plush. As described above, an accessory may include an RFID tag. The plush may optionally include a sensor pad on which the accessory is to be placed or to which the accessory is to be positioned proximate. Additionally, the plush may include an RFID reader. Thus, the plush may determine an identifier associated with the accessory. The user device may obtain the identifier, and utilizing the application, identify one or more actions to perform based on the identifier. For example, the user device may update the display to reflect the accessory. Optionally, the user device may update a portion of the display. For example, a portion of the display may be reserved for presenting non-face elements of the character (e.g., a map, text, and so on).

With respect to an interactive story or TV show, the user device may update the display to present information related to the story or TV show. For example, the TV show may direct users to place an accessory (e.g., an animal, a letter, a number, and so on) proximate to the plush. As will be described below, the TV show may be, at least in part, under control of an application. Thus, the TV show may update based on the use of the accessory. The user device may then update the display to reflect successful use of the accessory.

At block 1008, the user device updates based on interactions with the accessory. As described above, continued interactions with the accessory may cause continued updates to the display. With respect to the toothbrush, the user device may update to reflect use of the toothbrush. Optionally, a camera included in the user device may monitor for use of the accessory. Additionally, the user device may utilize sensor information obtained from sensors included in the plush. For example, the user device may update the display based on adjustment of the plush in three-dimensional. Space. Location information may be further utilized. For example, a global navigation satellite system (GNSS) receiver included in the user device or plush may be utilized to determine location information. The location information may be leveraged to inform weather conditions or other local or regional information.

In all situations in which a camera, microphone, and so on of the user device is utilized monitor a real-world environment, it should be understood that this functionality may be opt-in, and otherwise disabled. Thus, a user may ensure that the user device is unable to utilize the camera, microphone, and so on. Additionally, it should be appreciated that privacy protections may put in place. For example, any images, audio, and so on may be encrypted and inaccessible to any party other than the user. As another example, any images, audio, and so on, may be immediately discarded upon use.

F. Interactive Body/Head

In some configurations, the sensor and sensor pads described, or others, are provided in the head and arms of the product. The head itself can detect a touch, squeeze, pickup, poke, and roll. One or more of the sensors can be located on the inside of the product for a hidden outwards appearance. This way the product can look and feel as any normal toy without obvious electronic components other than the electronic screen device. The head itself can also have embedded sensors, such as tilt, press, force, and/or capacitive touch sensors. Furthermore, the product (e.g., app) can take advantage of the sensors provided by the electronic screen device in addition to or in the alternative of dedicated sensors within the head or main body of the plush.

G. LED Communication

In some configurations, the product can provide feedback through LED (or other) lights or other visual indicators, independently and/or in conjunction with other feedback methods (such as in conjunction with onboard speaker or user interface in the electronic screen device). The LED communication can be enabled even when the electronic screen device is removed from the product. For example, the LED lighting up can be driven from the app game engine, such as a flash when the user achieves a new score in a game. The LED lighting can also be feedback driven by basic interactions such as shaking the product's arms or hugging its head.

H. Wireless Connection to Mobile Devices (Main Product and Additional Add-on Devices)

The signals acquired from the sensors can be wirelessly transmitted to the electronic screen device. These signals include ones detected on the product or any of its sensor-enabled add-on devices. An add-on device can be as small as detachable accessories for the product, or as large as another stand-alone device. For example, one example of an add-on device is a drawing pad configured to send signals to the plush. The add-on devices may have the similar detection mechanisms to the core product. The signals may be electronically transmitted directly to the electronic screen device or relayed through an inproduct microcontroller, microprocessor or other electronic device.

I. Attachment Regions

Attachment regions are for customizable physical elements/accessories for the product. An accessory includes objects such as detachable clothing, toys, and food for the product.

1. Velcro Patch Design on Body

The product can have attachable regions on its body. The attachment mechanism can vary and include methods such as hook and loop fasteners. The loop portion of the hook and loop fastener can be provided on the product body. This allows the user to easily attach and detach accessories such as tools, clothing items, or other objects. Through embedded RFID and other electronic tags inside the accessory, the product can detect which accessory was attached and provide appropriate feedback.

J. Button

Sensors on the product can include buttons, as well. The button(s) can be configured to be pushed by a user to send a signal to the electronic screen device.

K. Releasable Regions

Some body regions can be detached from the core. For example, an octopus plush can have arms that can detach from the main plush but that are still interactive via wireless communication.

L. Motors to Move Body, Move to/from Players and Respond to Surroundings—Movement of Arms/Head Individually as a Response to Gaze, Book or Player The product can move as a response to user input, change in its surroundings, or due to its own artificial intelligence or programmed logic. It can move to and from certain objects, such as the player, an accessory, an accompanying storybook, or an object of interest that it has determined, or it can move in place and change positions. In some configurations, the plush includes internal motors and, if relevant, motion transfer mechanisms to convert rotation of a motor output into desired movement of a portion of the plush.

M. Face Cut-Outs

The screen of the electronic device may be partially obscured with material from the product for better integration. For example, the entirety of the rectangular screen (of at least certain size devices) may not be visible. Only certain parts such as facial features may be visible to provide for a more integrated and immersive play experience. Optionally, a portion of the plush (e.g., portion 804 illustrated in FIG. 8A) may occlude or block a portion of the electronic screen device. Thus, the device may be separated into a first portion 806 (e.g., representing a face) and a second portion 808. Optionally, the first portion may represent a portion of the face (e.g., eyes or mouth) and the second portion may represent a remainder of the face.

II. Using Sensors in Mobile Device for Interactivity

A. Sensors

As discussed above, a number of different sensors may be provided in the plush and/or in related accessories. An example of such sensors includes (but is not limited to): Ambient Temperature, Gravity, Light, Linear Acceleration, Magnetic Field, Pressure, Proximity, Relative Humidity, NFC, Microphone, Camera, GPS, Accelerometer, Compass, Gyroscope, WiFi, Bluetooth, Proximity. The application in the product may utilize sensors from both the physical product itself and the electronic screen device. For example, it may use the microphone to mimic the user's speech or the camera to copy his movements or use the accelerometer and gyroscope in the tablet to sense the product's orientation.

B. Interactivity

1. Detecting Device Put in Plush

The product can use sensors and camera in the electronic screen device to detect when the electronic screen device has been inserted. For example, this detection can work through a physical proximity sensor or by being in range of Bluetooth® or another wireless communication arrangement. Additionally, the electronic screen device may utilize its sensors (e.g., accelerometer, camera) to detect when it is inserted. For example, the device may detect movement downwards, and detect when the camera is occluded due to a portion of the plush. This information may be leveraged optionally in combination with the proximity sensor, Bluetooth, and so on (e.g., a combination of signals may be utilized, such as in a voting scheme).

Once the insertion has been detected, the system can automatically begin a startup sequence or automatically launch into a game. Optionally, confirmation may be required from a user. For example, the user may provide a verbal command indicating inclusion of the device in the plush.

2. Gesture and Motion Control

The product can use the built-in camera of the electronic screen device to detect player gestures and motions. For example, it can first detect the outline of the player's and or body. Then, either using an internal 2-D or 3-D model, it can decipher the users' movements.

3. Detecting Movement of Plush

The product can use sensors/camera in the electronic screen device to detect when the product has been moved. For example, it can use an accelerometer to determine that it is being moved. It can also use the camera to detect a difference in its surroundings.

4. Detecting Emotions

The product can use sensors and camera in the electronic screen device to detect emotions in the user. It can use the camera to capture facial features and process those features and feature changes through software. For example, the device may utilize machine learning to analyze captured facial features. Examples of machine learning may be based on neural networks, recurrent neural networks, and so on. Optionally, the device may utilize one or more APIs, such as TensorFlow, and so on to perform the analyses.

5. Voice and Conversation

The product can use the onboard microphone and speaker in the electronic screen device to detect and produce voice communication.

6. Location Info

The product can use sensors, such as GPS (e.g., GNSS) or wireless radio triangulation, in the electronic screen device to detect where it is currently located geographically and use that information to inform and alter the application. For example, virtualized location beacons may be placed in real-world environments. The product may determine its location, and whether it is within a threshold distance of a beacon. For example, the product may obtain (e.g., periodically) an updated listing of the beacons. In this example, the product may utilize Wi-Fi to obtain the listing. As another example, the product may utilize a cellular connection (e.g., 4G, LTE, and so on) to obtain an updated listing of the beacons. Thus, as the product moves to within a threshold location of particular location coordinates, the product may update presentation of its display.

Optionally, users may utilize user devices to mark certain locations. For example, a user may utilize a mobile device or tablet to cause a marking of the user's current location. The user may select one or more actions that are to be performed by other products, or products of specific other users, when the products are at the location. As an example, a user may hide certain virtual treasure at his/her location. If another user happens upon the location, the product may update its display (e.g., a particular portion, such as a second portion) to indicate successful capture of the treasure. Optionally, augmented reality functionality may be utilized. For example, users may view displays on their user devices for information indicative of marked locations. As another example, the product may present certain visual indicators of marked locations. In this example, an arrow may be included on a display of a user's product indicating a location of a marketed location. Optionally, the product may verbalize directions to reach the location (e.g., 'I think treasure is located to the right!').

7. Two Products Talking to Each Other

The product can use functionality in the electronic screen device to enable two similar products to communicate with each other through sound, visual, wireless data, or other communication methods. For example, one product can have a storyline where it needs to pick a path on the road to follow, and communicates that decision wirelessly to the second product, which uses the same path in its own storyline. Or, on a more basic level, the products can talk to each other and influence each other's actions. For example, using product A's arms to touch product B's screen or body to trigger a gameplay.

Optionally, multiple products may interact in concert. For example, a game may involve multiple plushes performing similar actions within a threshold time. In this example, a user device or server may receive information from the plushes indicating movement (e.g., based on sensor information for each plush). If the plushes successfully perform the actions (e.g., placement of specific tokens, such as letters on a sensor pad, and so on), the plushes respective displays may update to reflect the success. For example, the faces of the plushes may make particular facial expressions (e.g., excited expressions), or other information or text may be presented (e.g., congratulatory text, summary information, such as who was the fastest to perform the actions, and so on).

8. Face Recognition or Log in Profile—Product Recognizes Different Player, Different Profiles for Different Player The product can use sensors in the electronic screen device to detect who is playing with it. For example, the product can use the camera for visual identification, microphone for audible identification or can detect a token or fob identified with a particular user to determine the identity of the person using the product. The product can also access the player's profile to enable certain settings or continue a certain application or game at a particular place.

III. Types of Interaction with Product

In some configurations, and as described above, the product can interact with accessories and other devices (e.g., another interactive plush toy). The product can be configured to have many different ways to interact with an accessory, such as those described below.

A. Interact with Book

In some configurations, a book (or series of books) is specially configured to interact with the product. An example of a book is included as an appendix to this application. For example, the book can include pieces that are interactive with the product via any suitable arrangement or method, such as those described herein. The product's body part can be used to sense elements in the book, such as RFID elements, for example and without limitation. The book can re-assemble into another interactive component. For example, one or more of the pages of the book themselves can be interactive components that are detected by their inherent pictures, QR codes, or physical animation, among other possibilities. In some configurations, the pages can be re-arranged into another image to create other sets of interactive pieces. For example, page one and page three can be put together to create a new image. Pieces from the book can be detached or fold up (e.g., like origami or pop-up book) to reformat into interactive components, and the component can also be reused in other games. For example, a page can be detached and fold up to become a ship, and the ship can trigger a sing-a-long game in App 01, and a spelling game in App 02. The RFID tags (story tokens) can be use in other books to create new sets of interactions. For example, book1 can have A B C's RFID tags that are used in a simple "letter recognition game," however, book2 can reutilize these tags as a more advanced "word spelling game". The book can guide a user or player through how to interact with the product. The book itself can wirelessly link to the plush and send signals. In such an arrangement, the book can operate as an individual controller for a game played using the book, plush and electronic screen device.

As an example of the book, a book may request that a user perform certain actions involving the plush. For example, the book may request that a certain token be placed on a sensor pad, or placed within a threshold distance of the plush. In response, the display of the plush may update to reflect the successful placement. Optionally, the display, or a speaker of the display or plush, may output information related to the book. As an example, the book may indicate that to stop a certain enemy the hero of the book has to place a story token on the sensor pad. Upon a successful completion of this, the display may update to illustrate the face of the plush celebrating.

Optionally, sensor information may be utilized in combination with the tokens, or other accessories. For example, a book (e.g., physical book, interactive book such as on a tablet or mobile device) may request that a user count a certain number of objects illustrated in the book. The user may then have to place a particular token on a sensory pad. In addition, the user may have to grab the plush, raise the plush, and so on, the certain number of times. The plush may thus utilize the sensor information to confirm the certain number, and thus increase interactivity with the plush. Similarly, the user may be requested by an interactive story (e.g., via a TV or user device) to sing or verbalize certain words. Optionally, the plush may update in response to the singing or verbalizing.

Optionally, the plush (e.g., the electronic screen device within the plush) may obtain information indicating that a user initiated an interactive story on a user device. For example, the user device may provide wireless information to the plush indicating the start. As another example, the user device may output certain audio associated with starting. As another example, the user device may update user profile information associated with a user of the plush. The user profile information may be stored by an outside system. Thus, the electronic screen device within the plush may be pushed information indicating the start (e.g., from the outside system). The plush may then identify a progress associated with the interactive story. For example, the plush may identify a progress based on a most recently utilized story token. The plush may thus correlate this story token with the interactive story. As another example, the plush may receive (e.g., be pushed) information indicating progress from the outside system.

Optionally, the interactive story may cause the plush to perform certain actions (e.g., speaking at certain parts, singing in certain parts, and so on). The interactive story may indicate that when the plush performs the actions, the user is to perform certain actions also. For example, the user may be required to place a story token proximate to the plush. As another example, the user may be required to clap the appendages of the plush. In this example, the plush may utilize its sensors to determine whether the clapping occurred. The plush may then provide information to the user device presenting the interactive story indicating successful clapping.

Optionally, the interactive story may trigger presentation of a game on the electronic screen device included in the plush. For example, the interactive story may indicate that a user is to complete a particular game via the electronic screen device. The electronic screen device may then present the particular game (e.g., via an application), for example in a particular portion of the display or in the entirety of the display. Optionally, a face presented on the device may make facial expressions or look upwards at a game being played. Upon completion of the game, the interactive story may continue and optionally the electronic screen device may indicate successful completion.

B. Auto-Read a Book

The product can automatically read the book to a user, either by (1) reading straight through the book, (2) beginning reading and waiting for affirmation to continue, (3) reading when prompted through visual or other recognition of which page the user is on, (4) reading the correct text through sensor prompts embedded in the book, for example and without limitation.

C. Physical Interaction

The product can be configured to interact by reaching out with its body and connecting with the user. The product can also shy away from the user. This can be done as part of the storyline of an accompanying book accessory or as a core feature in an app such as an app where the product follows the user around. These features can be accomplished by employing motors and motion transmission arrangements, as discussed herein, or by another other suitable arrangements/methods for creating movement of a toy.

D. Attract/Repel Book or Accessory or Another Product

In some configurations, the product can be attracted or repelled to a storybook or accessory or another similar product. For example, the product can be repelled by other products during a game of "tag" where it attempts to avoid being tagged.

E. Interactive Book, Create Your Own Adventure

The product can interact with a storybook by altering the storyline, for example by suggesting the user go to a different page, introducing text not in the story book, by replacing certain text, or adding certain activities, such as singing, for example and without limitation. As another example, the product can automatically introduce the name and picture of the current city into the story by detecting it through the GPS of the electronic screen device or by other suitable methods. Or, based on the player's choice, the product can alter the storyline and give different responses.

F. Talks to Different Kids Differently

The product can be configured to recognize the user and speak to different users differently depending on age, learning ability, gender, or other characteristics. For example, the product can read faster and use more advanced words with older users and conversely read more slowly and use more basic language with toddlers. The product does not necessary detect the different characteristic of the user—such characteristics could be entered as part of a profile of the particular user. The product could be configured to recognize a particular user from a selected group of users by visual identification, voice identification, other biometric identification, or by the user selecting his or her own profile.

G. Dialogue

Based on the electronic functionality, the product can have preprogrammed or dynamic conversations with the user using artificial intelligence. The engine behind the dialogue can be based in an app or on a server or use third party conversation software.

H. Random Interactivity (Product Suggests Different Adventure Each Time)

The product can randomly alter the storyline for a set number of unlimited variations. The product can be configured to give a different answer in game or book depending on the time of day, day of week and holiday, for example. This can be used to simply introduce randomness. It can also be used for specific purposes, such as selecting a more stimulating and educational game during the day, and selecting a bedtime game or story at night.

I. Copy Player Movement or Partner Dance with Player

The product or on-screen application can mimic, conform to, mirror, or interact with the user through human-like movement, such as dancing.

J. Interactions with TV Show

The product may be configured to be utilized in conjunction with a television (TV) show. As will be described, the TV show may be presented via a smart TV platform, such as an Apple TV®, Roku®, and so on. In this example, a TV may present a particular TV show. The product may utilize the included electronic screen device to present information related to the particular TV show. In this way, the TV show may request that a user (e.g., child) perform a particular action. For example, the TV show may request that the child select from among multiple options (e.g., choose your own adventure). As another example, the TV show may request that the child utilize an accessory with the product (e.g., as described above). The TV show may then be updated based on these actions. For example, a character within the TV show may request that the user perform a mathematical operation. In response, the user may place an accessory associated with a number on a sensor pad of the product. If the accessory is the correct number, the TV show may congratulate the user.

Figure 11:
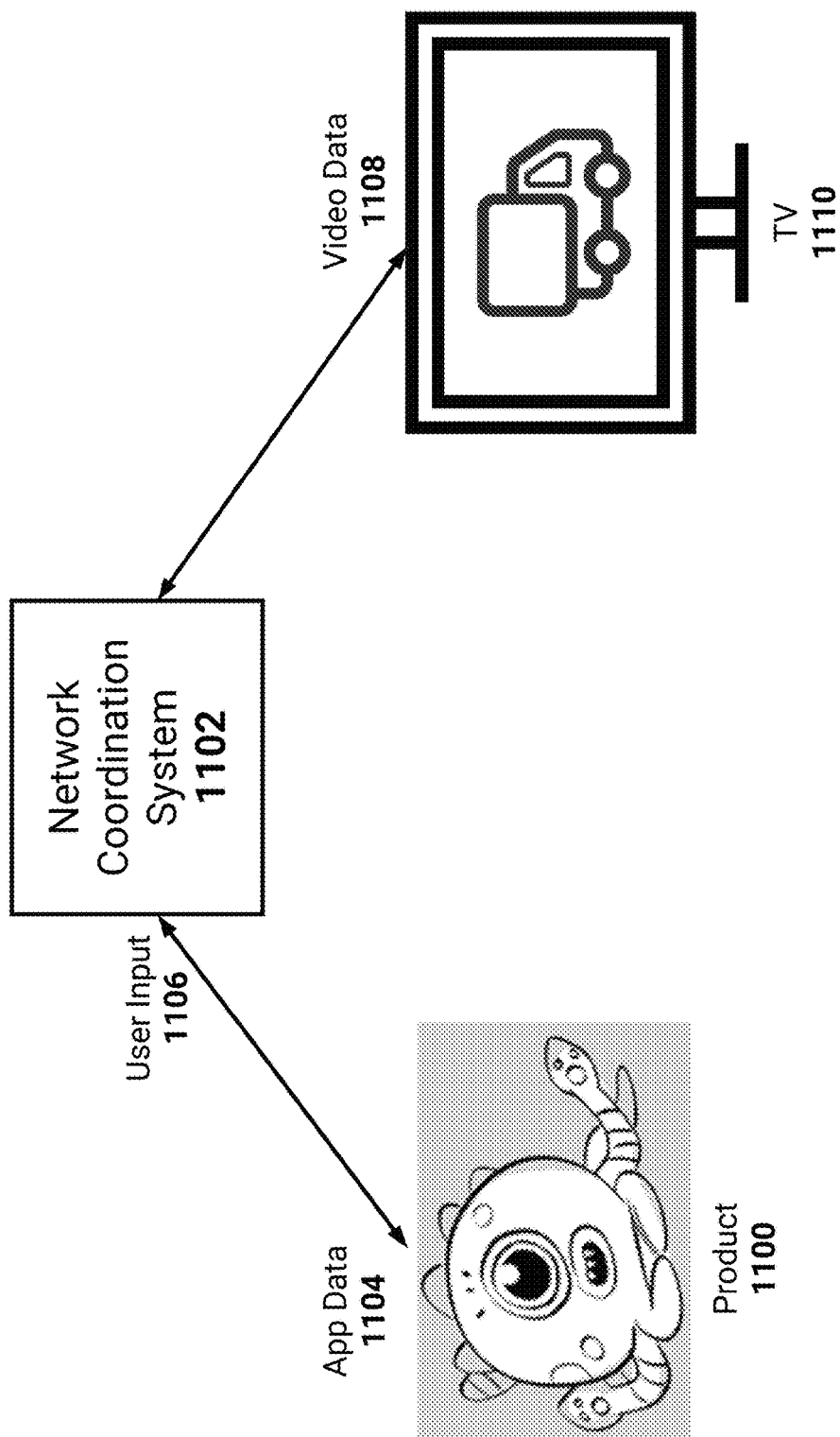
FIG. 11 illustrates an example of the product being utilized in conjunction with a TV.

FIG. 11 illustrates an example of the product 1100 being utilized in conjunction with a TV 1110. As illustrated, the TV 1110 is presenting a particular TV show. For example, the particular TV show may be presented via an application executing on a smart TV platform providing output to the TV 1110. The product 1110 may execute an application (e.g., an included electronic screen device may execute the application). For example, a user may select the application and cause its initiation. Optionally, the application may be associated with interactions with a TV, or the application may be associated with presenting a face for the product 1100. In the latter example, the application may be triggered to interact with the TV show. For example, the product may detect (e.g., via a microphone) a unique sound or word and identify that the unique sound or word corresponds to the TV show. In this way, the product 1100 may determine that it is to interact with the TV 1110.

As illustrated in FIG. 11, a network coordination system 1102 is illustrated as being in communication with the TV 1110 and product 1100. The network coordination system 1102 may be a system of one or more computers, one or more virtual machines executing on a system of one or more computers, and so on. The network coordination system 1102 may receive information indicating a particular TV show being watched via the TV 1110. For example, a smart TV platform may indicate selection of the particular TV show. The system 1102 may then provide information to the product 1100 regarding the selection.

For example, app data 1104 may be provided to the product 1100. App data 1104 may include particular actions for the product 1100 to perform. Example actions may include visual elements to display via an electronic screen device, verbal commands to output, and so on. Thus, the particular TV show may include a portion requesting a user of the product 1100 to perform an action. The app data 1104 may include information indicative of the request. Thus, the product 1100 may request that a user of the product 1100 perform the action. An example action may include selecting from among multiple options presented on the electronic screen device. Another example action may include requiring the user to adjust one or more appendages of the product 1100 in a particular manner or coordinate action. For example, the user may be required to make the product 1100 dance, raise hands of the product 1100, and so on.

App data 1104 may also be synced (e.g., in real-time, or substantially real-time) with presentation of the particular TV show. For example, the network coordination system 1102 may cause output of visual information on the electronic screen device. The visual information may correspond to the video data 1108. As an example, the particular TV show may illustrate a red truck on the TV 1110. The application executing on the electronic screen device may obtain information (e.g., from the system 1102) indicating that the red truck is presently on the TV 1110. Thus, the product may update its display to reflect the red truck. Optionally, the product may verbally announce, 'Red Truck!'.

The product 1100 may also provide user input 1106 to the network coordination system 1102. Example user input may include selections performed on an electronic screen device, verbal commands provided by a user, information detected from, or based on detection of, sensors included in the product 1100, and so on. In this way, the network coordination system 1102 may cause an updating to the particular TV show. For example, if the particular TV show requested that the user make the product dance 1100, upon a positive determination of the dancing, the network coordinate system 1102 may update video data 1108 to the TV 1110. In this example, the TV 1110 may thus indicate successful completion of the dancing, also show characters dancing, and so on.

While the above described use of a network coordinate system 1102, optionally the functionality described above may be performed on a local area connection. For example, the product 1100 and TV 1110 may be connected to a same Wi-Fi network or router. The electronic screen device included in the product 1100 may cause presentation of video content on the TV 1110 (e.g., over a streaming connection, such as via UDP, Airplay, and so on). As an example, the electronic screen device may stream video content from an outside content server over a network (e.g., the internet). Thus, the electronic screen device may control the particular TV show. Optionally, the electronic screen device may receive information identifying a first portion to be shown on its included electronic screen device and a second portion to be presented on the TV 1110.

In some embodiments, the TV show may be selected from without a smart TV platform. For example, the product 1100 may be in communication with an outside system (e.g., the network coordination system 1002). In this example, the outside system may provide video data 1108 to the TV 1110 over a cable connection (e.g., video-on-demand functionality). The product 1100 may utilize the included electronic screen device to provide information to the outside system. For example, a particular TV show may request that users watching the particular TV show perform an addition of two numbers. A user viewing the particular TV show may select an appropriate accessory (e.g., a number reflecting the result of the addition), and include the accessory on a sensor pad of the product 1100. The electronic screen device may obtain an identification of the selected number, and provide the identified number to the outside system for processing. If the number is correct, the outside system may update the video data 1108.

IV. Interaction Between Multiple Plushes

In addition, two plushes can be configured to interact with each other using sensors in the plush(es) or sensors in the electronic screen devices. Further description of two or more plushes interacting is included above.

V. Digital Library for Smart Toys

A. Digital Library

The product can be accompanied by a digital library of applications. This library can be accessed independently through an online or application store, or within the product application itself. The product can access all the applications within the library during gameplay. One implementation of this is to allow the library to always be available through the main app. The user can access both free and paid apps through the library for additional functionality.

B. Enhanced Functionality

The application library can contain programs that may be enhanced to work with the sensors and functionality within the physical product. For example, there may be a basic "Count 1-2-3" Game where the basic app asks you to count 1-2-3 with it and verifies through the microphone that you are counting correctly. There can be a more advanced version that utilizes the sensors in the physical product, that for examples asks you to hold up 1, 2, and 3, fingers from the product as you count with it.

C. Payments

This library can be accessed via a free, one-time fee, or recurring charge sales model. Payment can be conducted via credit card, pre-purchased in-system tokens, cryptocurrencies, or other payment processors, such as BitCoin, PayPal, and Venmo.

VI. Different Modes

In some configurations, the system can provide multiple ways to interact or play with the plush. For example, in some configurations, there are provided (at least) three ways to play: A) with the device inside the plush, B) with the device on the side of plush, and C) with an expansion device wirelessly connected to the plush.

A. Device Inside Plush

The product can be used with the electronic screen device secured within the product. For example, in this configuration, the electronic screen device can act as an adaptable face of the product. Such an arrangement has been described at length herein.

B. Device on the Side of Plush

The product can be used with the electronic screen device outside of the product, in which case its physical sensors can still work. For example, the electronic screen device can sit on a table and act as a supermarket cash register. The product can play the role of a customer and thus the electronic screen device and the product are both used for gameplay, but are physically separate from one another.

C. Expansion Device

The product can be used with the electronic screen device secured within the product and controlled or activated through a separate expansion device or accessory, such as a separate game controller or tool. For example, one tablet can act as the face of the product. A second tablet held by the user can be used to move its body and arms.

D. Augmented Reality

As described above, the product (e.g., plush) may be utilized on conjunction with a different user device to present augmented reality (AR) content via the different user device. For example, the product may be placed in a real-world environment. The different user device may then utilize its camera to present a representation of the real-world environment. Included within the real-world environment may be virtual content, such as virtual content utilizing one or more APIs (e.g., ARKit, ARCore, and so on).

Figure 12A:
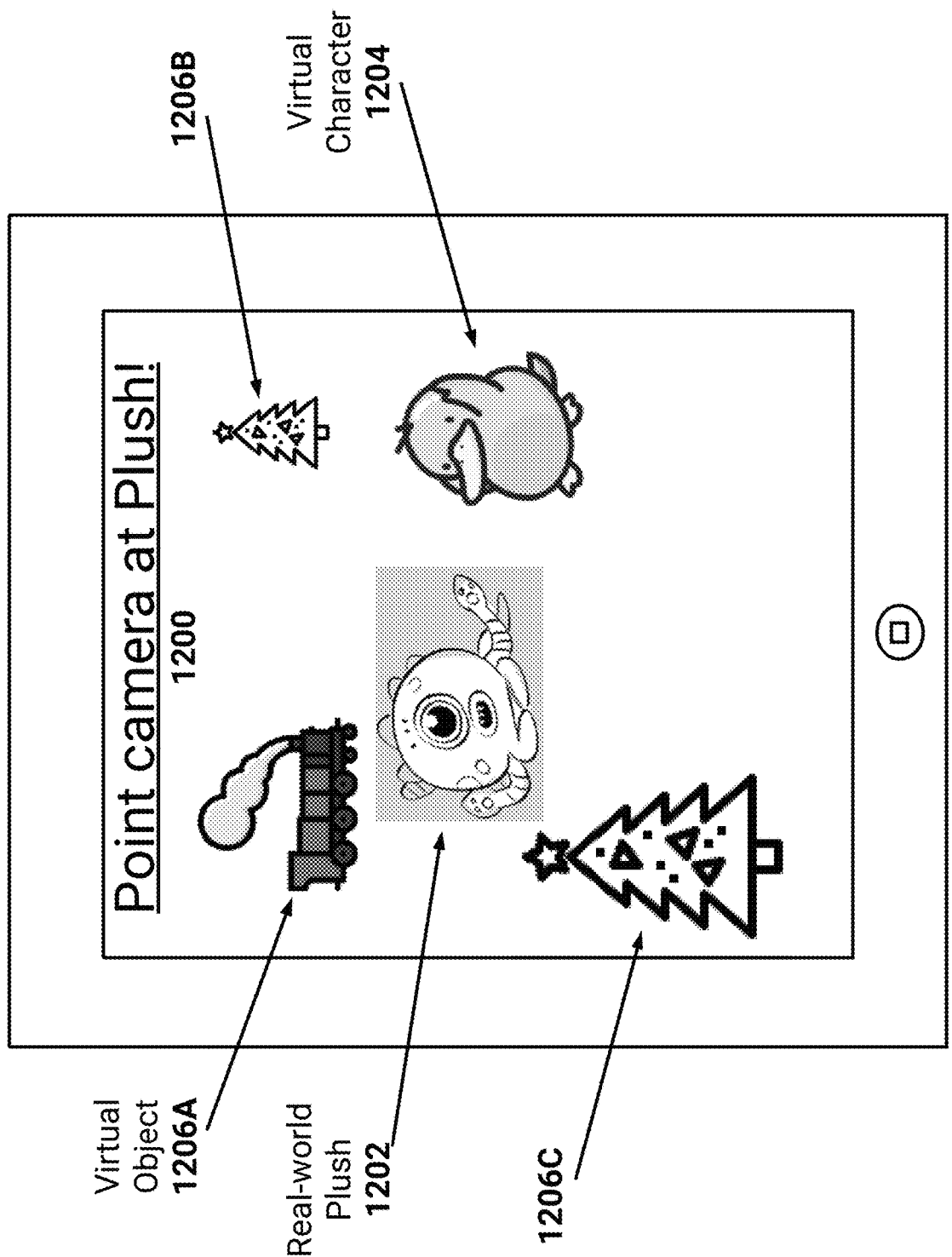
FIG. 12A illustrates an example Augmented Reality (AR) scene which includes a real-world plush.

FIG. 12A illustrates an example Augmented Reality (AR) scene 1200 which includes a real-world plush 1202. The real-world plush 1202 may be included within a home or other environment (e.g., outside) of a user. As illustrated in FIG. 12A, a user device (e.g., a tablet) is being utilized to obtain images, or video, of the real-world plush 1202. The user device has also included virtual content. Example virtual content may include a virtual character (1204), virtual objects 1206A-1206C, and so on.

The user device may identify the real-world plush 1202 according to varying schemes. For example, it should be appreciated that an application implementing augmented-reality functionality (e.g., based on ARKit, and so on) may learn to identify particular objects. In this example, a user may provide the specific plush 1202 proximate to a camera of the user device. The user device may then identify that the plush 1202 is to be included in an AR scene. As another example, the user device included in the plush 1202 may present certain visual information indicating that it is inserted into a plush configured to be included in an AR scene. Example visual information may include one or more pixels illustrating a unique pattern, a temporary or periodic presentation of certain visual elements, and so on. Optionally, a user of the plush 1202 may point to the plush 1202. Optionally, the user device may learn an appearance of a user of the plush 1202. Thus, the user device may associate the plush with the user. As another example, the plush 1202 may include particular sensors configured to provide information to the user device (e.g., a Bluetooth beacon, RFID tag, and so on).

Optionally, the AR scene 1200 may be based, at least in part, on accessories presented proximate to the real-world plush 1202. As described above, a play setting may be utilized with the plush 1202. In this example, the play setting may inform the types of virtual content shown in the AR scene 1200. Additionally, a first user may manipulate the plush 1202 while a second user utilizes the user device to view the AR scene 1200. In this example, the AR scene 1200 may be updated based on sensor information from the plush 1200. For example, if the plush is shaken rapidly, the AR scene 1200 may be updated to mimic an earthquake. The plush may thus provide information (e.g., via a local connection, or over the internet) to the user device regarding the sensor information.

Figure 12B:
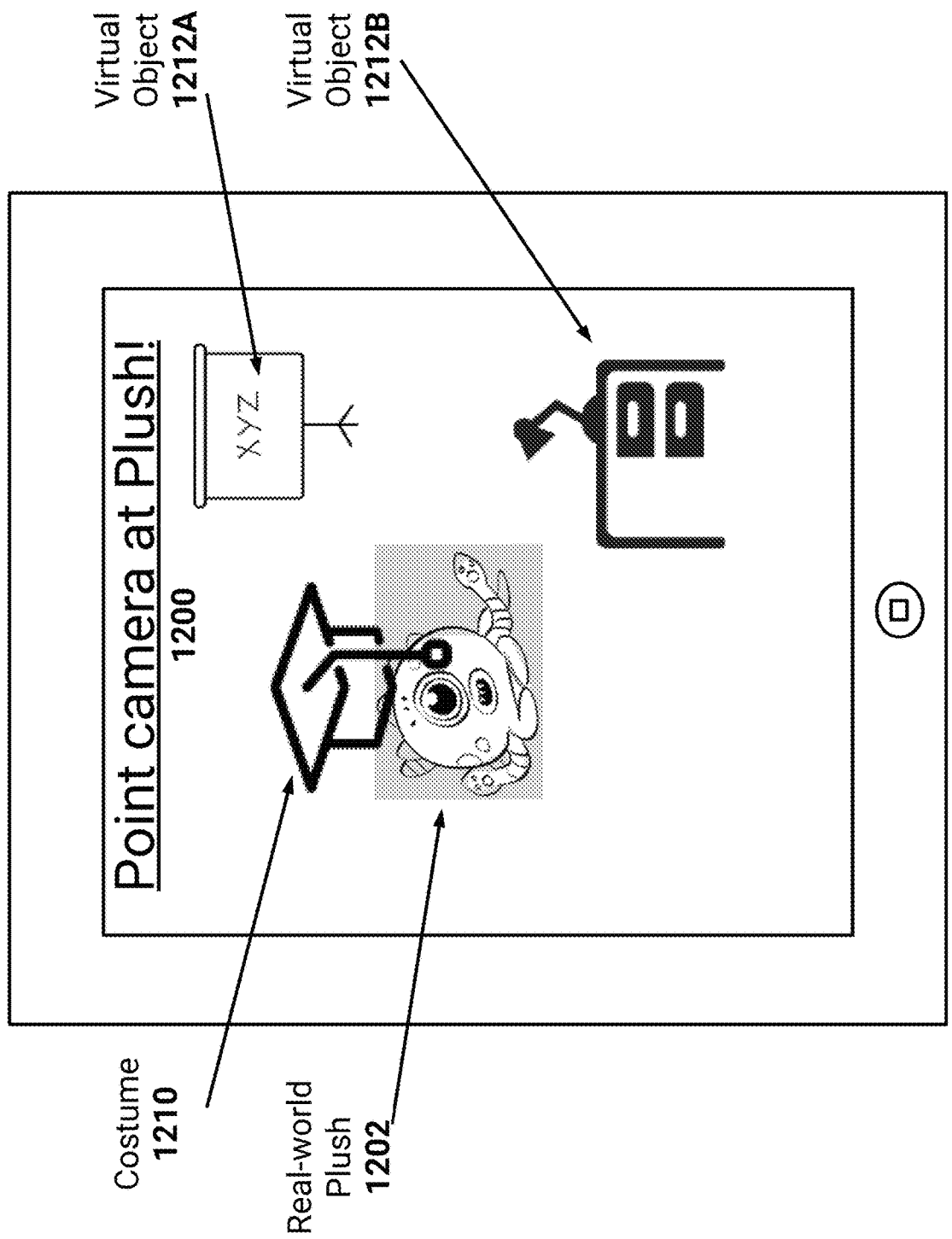
FIG. 12B illustrates another example AR scene which includes a real-world plush with a costume.

As another example of an accessory, FIG. 12B illustrates another example AR scene which includes the real-world plush 1202 with a costume 1210. As described above, a costume may comprise a wireless or visual identifier. For example, the identifier may be associated with an RFID tag, Bluetooth beacon, bar or QR code, and so on. Additionally, the user interface presented via the user device inserted into the plush 1202 may be updated to reflect the costume 1210. As an example, a face associated with the plush 1202 may be updated (e.g., if the costume is a hat, the face may be updated to include a portion of the hat, such as a chin strap, or face paint and so on may be included).

In the example of FIG. 12B, the AR scene comprises a costume 1210 of a student or teaching hat. Thus, in this example, the AR scene has been rendered to reflect a teaching environment. For example, virtual objects 1212A-1212B are presented in the AR scene. The user device may thus obtain virtual content for inclusion in the AR scene based on the costume. Optionally, the user device may connect to an outside system, and indicate a unique identifier associated with the costume. The outside system may thus provide the virtual content for presentation.

As described above, an example of customized learning may comprise a spelling or word-based learning game. Optionally, a user may utilize the user device presenting the AR scene to view an AR scene related to this example customized learning game. A user may thus place tokens (e.g., letter tokens, with RFID tags) proximate to the plush 1202. For example, the user device presenting the AR scene may indicate provide words the user is to spell. As another example, the user device inserted in the plush 1202 may update its user interface to indicate words to be spelled. As another example, the user device, or plush 1202, may provide verbal output associated with the words. Thus, the user may place particular of the tokens proximate to the plush to spell a word. The AR scene may update to reflect whether the word was spelled successfully. For example, congratulatory virtual content may be shown, virtual object 1202A may update to indicate successful spelling, and so on.

In some embodiments, the user device may record the images, or video, presented on the user device. In this way, a user may later view the AR scene 1200. Additionally, the images, or video, may be uploaded to a social network platform for viewing by social media users.

VII. Product as a Controller

In some configurations, a user can manipulate the sensors of the plush toy to drive the app. The product can be used as a controller to drive the gameplay on the electronic screen device, as there are sensors embedded throughout the product. The main body or the appendages can be used as control elements by touching, squeezing, poking, and moving the various elements. For example, in some configurations, a user can play a musical drum game where the user has to control the arms of the product to enable a drumming action.

VIII. Product's Accessories, Interactive and Non-Interactive

A. Interactive

In some configurations, a user can use interactive accessories to change the state of the game (e.g., which page in book, which book, which game and which level in the game). The various accessories can be used to interact with the application and, thus, the plush. For example, (1) putting accessory clothes on the product can also add clothes onto its in-game persona, (2) the accessories can be answers to an in-game question, such as a math question or reading question, or (3) the accessories can be used to direct the application on a particular adventure path. The accessories can also be enabled to work with certain apps in certain places. For example, an accessory may only be activated for a storybook application on a certain screen.

B. Non-Interactive

In some configurations, the product may also include non-interactive accessories. For example, kids can dress the plush with Velcro-attached pieces as they wish. The Octobo™ plush, or other types of plushes, can have different costumes for festivals and different stories and games.

IX. Collects Data and Log Out—Automatic Diary

A. Tell Parents about Activities

In some configurations, the product (e.g., app) can be configured to record and indicate to parents information about the user's daily activities. For example, the product can log its activities and interactions to give the parents a summary of both the child's activities and his or her learning progress. For example, this can be done in a very literal chronological way, by listing out every action performed by the child and the product, or by using graphical aids such as charts and graphs to outline statistics such as words read to and spoken, intensity of effort, and movement.

As described above, the product may record interactions with users (e.g., children). For example, the product may record interactions with different users. Optionally, this information may be stored in user profile information and may be accessible by the parents. The parents may utilize a web browser to access the recorded information. For example, the product may be accessed over a local area network optionally with a user name/password of the parents. The parents may also utilize an application executing on their user device. Optionally, the parents may access the application executing on the electronic screen device inserted into the product.

The recorded information may reflect summary information associated use of the product. For example, the summary information may include statistics regarding use (e.g., times at which the product is utilized, an average length of time of use, and so on). Additionally, the summary information may reflect interactions with stories, television shows, and so on. Certain games may be utilized, such as to help a child learn his/her ABCs. Thus, the parents may view a report regarding progress of the learning. A learning level associated with the child may be presented, for example based on performance in games, progress through the letters, vocabulary words, spelling games, and so on.

B. Tell Researchers the Type of Behavior

In some configurations, the product can log its activities for research purposes to enable educational and/or behavioral studies. This can be kept on the product or transmitted to researchers with the user or his or her parent's permission, depending on age level or other relevant factors.

X. Adaptive Learning

A. Adaptive Learning Platform

In some configurations, an adaptive learning platform monitors and saves data from the interactions across all app experiences based on each user profile. From this data, the platform can extract the current learning ability and trajectory of each user across many different characteristics, such as math, reading, motor skills, emotional ability, etc. This information may be presented to parents, such as via the automatic diary described above.

B. Adaptive Learning in-App

In some configurations, an adaptive learning platform alters the application experience based on the aptitude of each user. This can be done based on data specific to the user. For example, if the user is spending a majority of his or her time playing advanced math games, the app can also present art and reading games to balance out the education. This can also be done based on data across all users. For example, the platform can choose to present particular storybooks that other users are most interacting with.

C. Adaptive Learning Recommendation Engine

In some configurations, the adaptive learning platform can also suggest new apps or storybooks that are suitable for the user. This can be based on self-learning or hard-coded as new content is released into the app and game library.

XI. Example Flowchart

Figure 13:
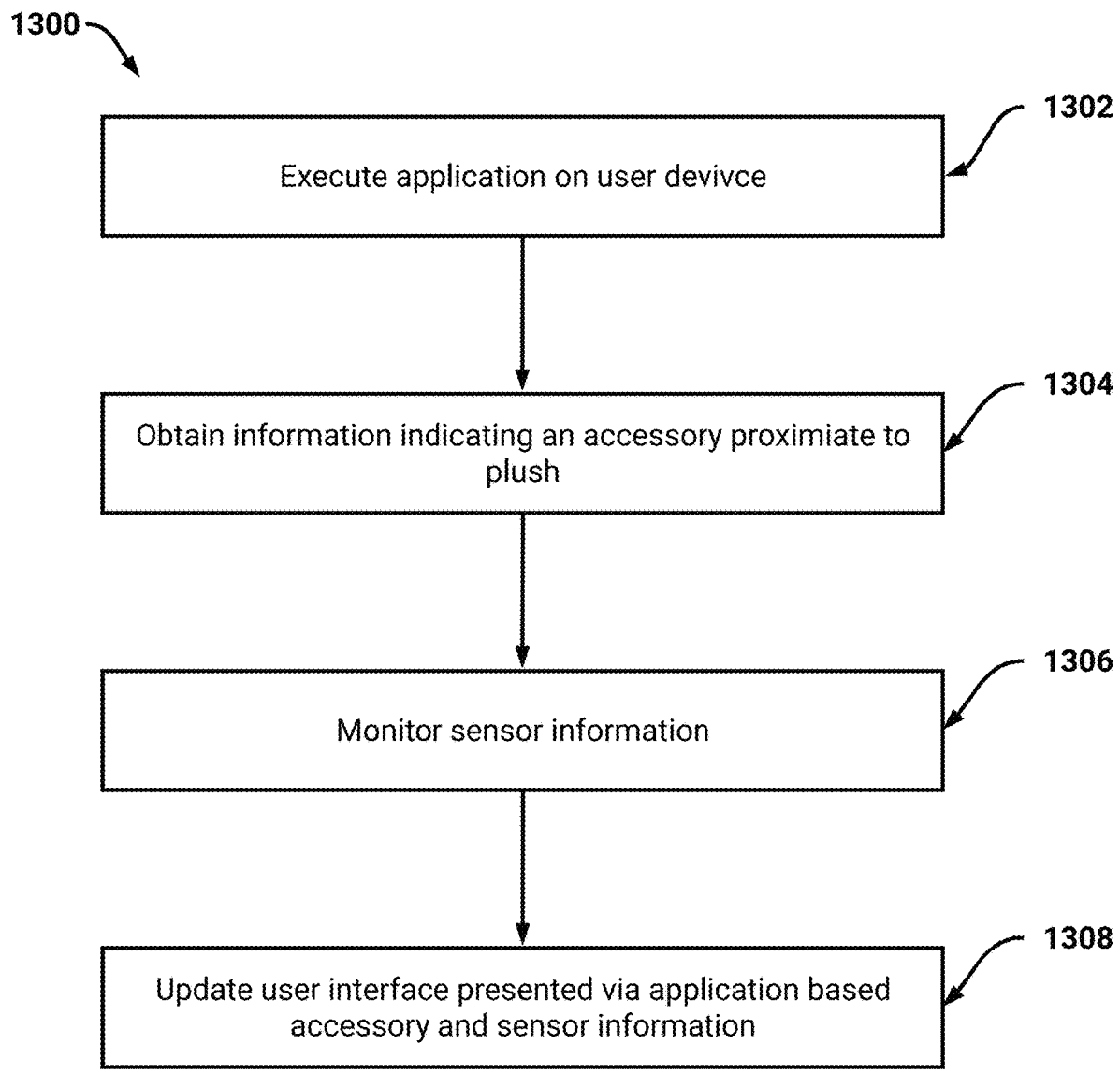
FIG. 13 illustrates a flowchart of an example process for updating a user interface presented on a user device included in an example plush.

FIG. 13 illustrates a flowchart of an example process 1300 for updating a user interface presented on a user device included in an example plush. For convenience, the process 1300 will be described as being performed by a user device of one or more processors (e.g., a tablet, a mobile device, and so on).

At block 1302, the user device executes an application on the user device. As described above, the user device may obtain the application from an online application store. The application may cause a user interface to be presented via the user device, which may include a face associated with a plush toy. Optionally, the user interface may include a first visual portion and a second visual portion. As described above, the first visual portion may reflect the face while the second visual portion may include instructions or other information to be provide to a user. For example, a map of a current location may be presented in the second visual portion. As another example, a map indicating location of a beacon or treasure (e.g., as described above) may be presented. The second visual portion may include text (e.g., from an interactive story, such that a user may read the story via the visual portion), or information related to a TV show a user is viewing.

At block 1304, the user device obtains information indicating an accessory positioned proximate to the user device. The user device, as described above, may be placed in a plush toy. The plush, or user device, may detect an accessory based on RFID information, Bluetooth information, a bar or QR code, and so on. Examples of accessories are described above, and may include at least a costume or outfit, a token, a play setting, a skateboard, and so on. As described above, the accessory may cause the user interface presented.

At block 1306, the user device monitors sensor information. The plush may comprise sensors (e.g., in appendages), and the user device may obtain sensor information from the plush toy. For example, the user device may obtain the information periodically, or the plush toy may push (e.g., as an interrupt) the information to the user device. Optionally, the user device may utilize its own sensors (e.g., accelerometers, location sensor, and so on).

At block 1308, the user device updates the user interface based on the accessory and sensor information. As described above, the user device may update the first visual portion and/or second visual portion based on the accessory and/or sensor information. For example, a face may be updated based on a costume and may illustrate the face and/or costume being moved or jostled based on detected movement of the plush toy (e.g., based on the sensor information). As another example, a second visual portion may be updated to reflect information. For example, the second visual portion may indicate successful spelling of a word based on detection of correct token accessories. In this example, the second visual portion may detect a hugging or raising of the plush toy via the sensors, and my update to reflect the hugging or raising. As an example, the second visual portion may thank the user, and so on.

CONCLUSION

All of the methods and processes described above may be embodied in, and fully automated via, software code modules executed by one or more computers or processors. The code modules may be stored in any type of non-transitory computer-readable media or other computer storage device(s). Some or all of the methods may alternatively be embodied in specialized computer hardware. Additionally, the functionality described herein as being perfumed by an app or application may instead, or in addition, be performed by a user device without an application. For example, the user device may be customized to perform the functionality or may include software or executable code configured to perform the functionality without utilization of an application.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise.

Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. An interactive plush toy, comprising:
a body comprising an outer layer defining an outer surface of the plush toy and an interior space, further comprising stuffing within the interior space;
a pocket within or attached to the body, the pocket configured to receive an electronic computing device having a display screen through an opening of the pocket; and
at least one display opening associated with the pocket such that at least a portion of the display screen positioned within the pocket during use is visible from external of the plush toy through the at least one display opening,
wherein the display opening includes an occluding portion configured to occlude a portion of the display screen, wherein the occluding portion separates the display opening into a first opening portion and a second opening portion; and
the electronic computing device, the electronic computing device being configured to execute an application, and wherein the application is configured to:
present a user interface for presentation, the user interface being separated into a first user interface portion being visible through the first opening portion and a second user interface portion being visible through the second opening portion, wherein the application is configured to separately update the first user interface portion and second user interface portion; and
update the user interface in response to detection of a unique identifier transmitted from an accessory proximate to the interactive plush toy.

2. The interactive plush toy of claim 1, wherein the first user interface portion comprises a face, rendered by the application, associated with the interactive plush toy.

3. The interactive plush toy of claim 2, wherein the accessory comprises a costume configured to placed on, or over, the interactive plush toy, and wherein updating the user interface comprises:
updating a visual appearance of the face based on the costume.

4. The interactive plush toy of claim 2, wherein the second user interface portion indicates information related to use of the plush toy by a user of the plush toy.

5. The interactive plush toy of claim 4, wherein the accessory comprises at least one token, and wherein the interactive plush toy further comprises:
a plurality of appendages extending from the body; and
a sensor pad on which the at least one token is configured to be placed, the sensor pad being located within a space defined by the appendages, wherein upon receipt of the at least one token, the sensor pad is configured to cause the second user interface portion to present one or more of a graphical representation of a map or depictions of characters referenced in a story associated with the at least one token.

6. The interactive plush toy 2, wherein the accessory comprises at least one token, and wherein the interactive plush toy of claim further comprises:
a plurality of appendages extending from the body; and
a sensor pad on which the at least one token is configured to be placed, the sensor pad being located within a space defined by the appendages, and the sensor pad comprising one more sensors configured to communicate with the electronic computing device.

7. The interactive plush toy of claim 6, wherein the sensor pad is configured to receive the at least one token, and wherein the one or more sensors are configured to detect the at least one token.

8. The interactive plush toy of claim 6, wherein the one or more sensors are radio-frequency identification (RFID) sensors.

9. The interactive plush toy of claim 1, further comprising at least one appendage extending from the body.

10. The interactive plush toy of claim 9, wherein the at least one appendage comprises at least one stabilizing appendage configured to contact a surface upon which the plush toy rests and provide support to the body to assist in holding the body in a desired position relative to the surface.

11. The interactive plush toy of claim 10, wherein the at least one stabilizing appendage comprises an internal, bendable support member.

12. The interactive plush toy of claim 9, wherein the at least one appendage comprises at least one interactive appendage, the at least one interactive appendage comprising at least one sensor configured to be connectable to the electronic computing device.

13. The interactive plush toy of claim 12, wherein the application is further configured to:
  receive sensor information associated with the at least one interactive appendage, the sensor information being generated by at least one sensor; and
  update the user interface based on the sensor information.

14. The interactive plush toy of claim 13, wherein the first user interface portion comprises a face, rendered by the application, associated with the interactive plush toy, and wherein updating the user interface comprises modifying the visual appearance of the face based on the sensor information.

* * * * *